United States Patent [19]

Asbury et al.

[11] Patent Number: 5,510,794
[45] Date of Patent: Apr. 23, 1996

[54] VEHICULAR RADAR WAYSIDE TRANSPONDER SYSTEM

[76] Inventors: Jimmie R. Asbury, P.O. Box 221057, San Diego, Calif. 92192; John W. Davis, 1512 Calle Narcisos, Encinitas, Calif. 92024

[21] Appl. No.: 185,135

[22] Filed: Jan. 21, 1994

Related U.S. Application Data

[63] Continuation-in-part of Ser. No. 20,600, Feb. 22, 1993, Pat. No. 5,285,207, which is a continuation of Ser. No. 756,176, Sep. 6, 1991, Pat. No. 5,189,426, which is a continuation-in-part of Ser. No. 695,951, May 6, 1991, abandoned, which is a continuation-in-part of Ser. No. 376,812, Jul. 7, 1989, abandoned.

[51] Int. Cl.$^6$ .................................................. G01S 13/74
[52] U.S. Cl. .............................. 342/42; 342/43; 342/44; 342/50
[58] Field of Search .............................. 342/42, 43, 44, 342/45, 46, 50

[56] References Cited

U.S. PATENT DOCUMENTS

| | | |
|---|---|---|
| 4,278,975 | 7/1981 | Kimura et al. |
| 5,196,846 | 3/1993 | Brockelsby et al. ............ 342/42 |
| 5,245,346 | 9/1993 | Nishimura et al. ............ 342/42 |
| 5,387,916 | 2/1995 | Cohn ............................ 342/44 |

*Primary Examiner*—J. Woodrow Eldred
*Attorney, Agent, or Firm*—Baker, Maxham, Jester & Meador

[57] ABSTRACT

Doppler control circuit for a CW or pulse Doppler radar system for monitoring not only the phase shift between echo signals from several targets but also the amplitude difference between the several targets and to further provide a phase lock loop which tunes the radar to a particular target among one or more targets from which echo signals return. The control circuit can be used in state of the art CW or pulse Doppler type radar systems. In a further system, a continuously generated radar signal is repeatedly transmitted at three different frequencies in time division fashion to define a succession of transmit and receive frames. The receive frames are divided into a plurality of time interval windows with selected windows being used to detect received signals at the different frequencies. The remaining windows can be used for subsystems of the radar system. The rate of phase shift of received signals at a center frequency is used to determine closing rate, while the phase shift difference between received signals at the other two frequencies is used to determine range. A subsystem of the vehicular radar system is provided, in which communications between the vehicle radar system and a wayside transponder take place within one of the remaining windows of the receive frames. The wayside transponders transmit multi-bit words to the vehicle to provide the vehicle with update information and to warn of possible hazards in particular locations.

14 Claims, 19 Drawing Sheets

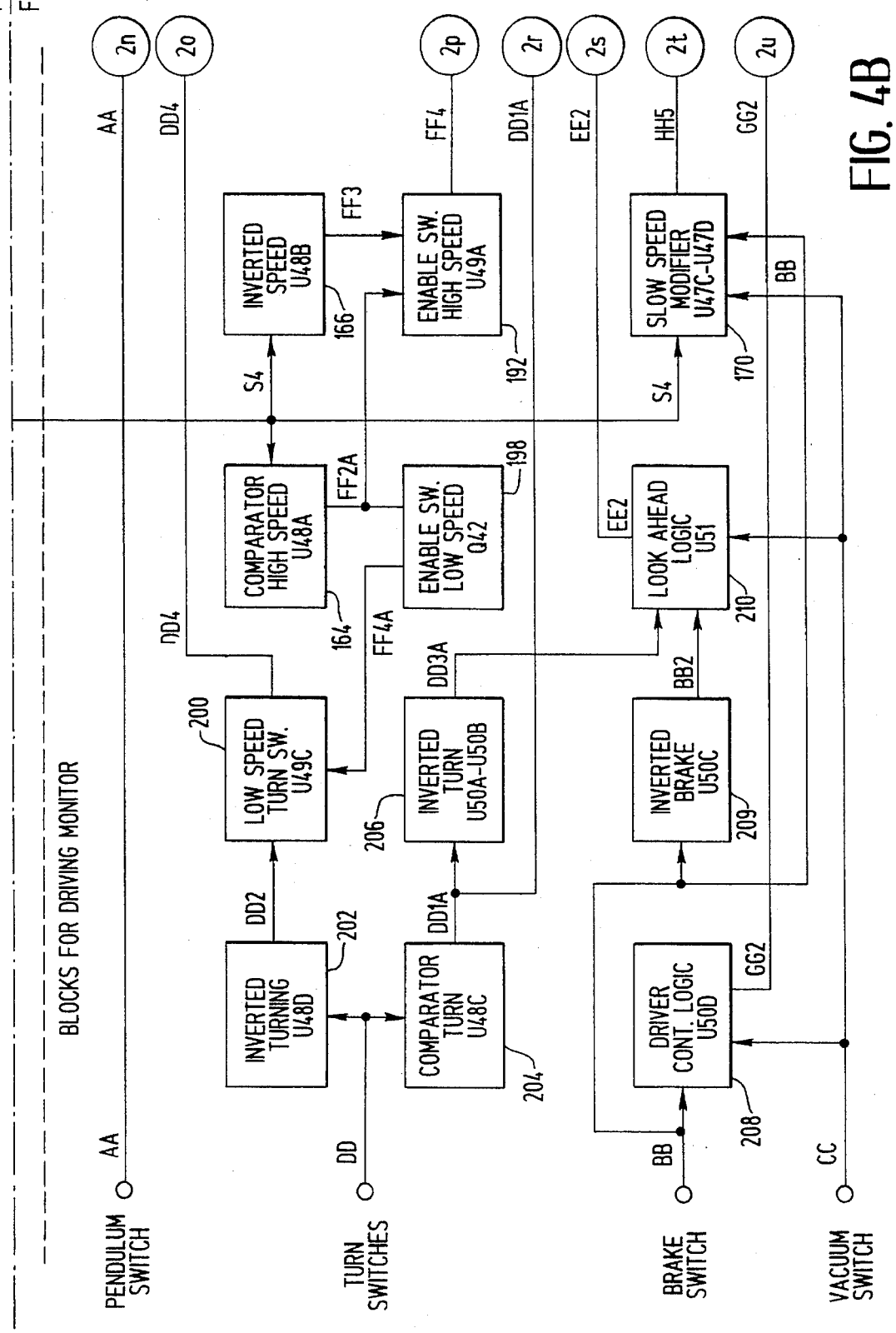

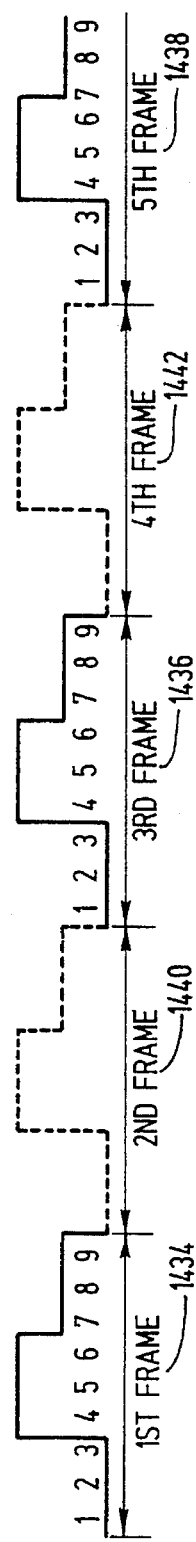
FIG. 15A
FIG. 15B
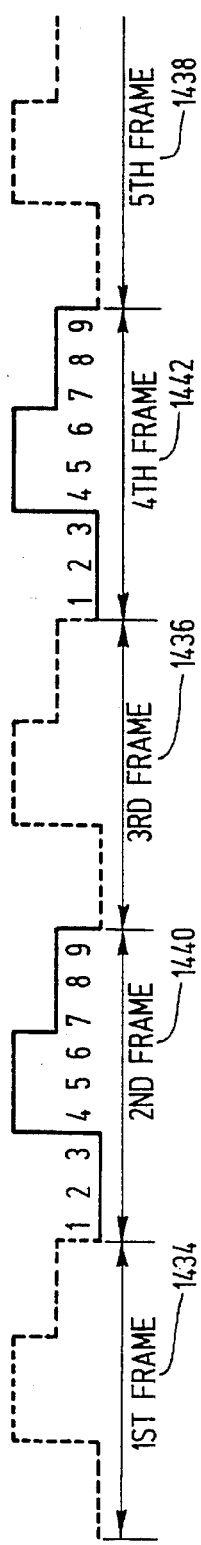
FIG. 15C
FIG. 15D
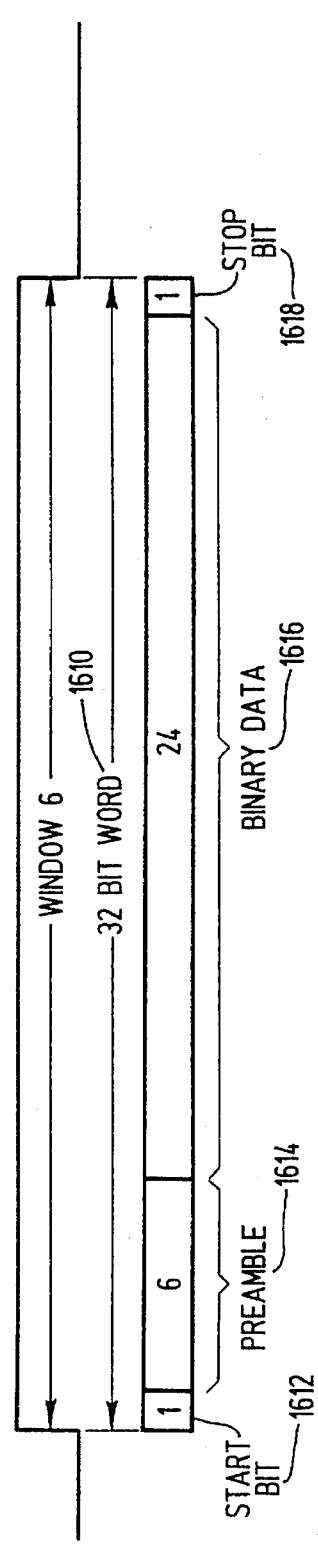
FIG. 16

VEHICULAR RADAR WAYSIDE TRANSPONDER SYSTEM

RELATED APPLICATION

This application is a continuation-in-part of application Ser. No. 08/020,600 of Jimmie Asbury and John W. Davis, which application was filed Feb. 22, 1993, now U.S. Pat. No. 5,285,207, and is entitled MULTI-FREQUENCY AUTOMOTIVE RADAR SYSTEM, which is a continuation of Ser. No. 07/756,176 filed Sep. 6, 1991, now U.S. Pat. No. 5,189,426, which is a continuation-in-part of Ser. No. 07/695,951 filed May 6, 1991, abandoned, which is a continuation-in-part of Ser. No. 07/376,812 filed Jul. 7, 1989, now abandoned.

BACKGROUND OF THE INVENTION

1. Field of the Invention

The invention is directed to vehicle borne radar systems, and more particularly to such systems which utilize wayside transponders to communicate with and provide information to the vehicle.

2. Description of Related Art

There is a continuing need to improve the safety of highway vehicles to prevent such vehicles from impacting with moving and stationary objects. Concurrently, there is a need to safely increase the density of vehicles traveling the world's roadways. These seemingly opposing goals can be achieved by providing a means for each vehicle to monitor the distance, speed and direction of other vehicles traveling on the same roadway. A number of systems are presently known which allow such monitoring to be accomplished relatively inexpensively and accurately.

In addition to increasing the density and safety of our roadways, there is a further desire to improve the flow of information between vehicles and information gathering services, such as traffic information services and highway police, to allow traffic to move smoothly around areas of congestion and to provide a means by which an operator of a vehicle can be alerted to dangerous or otherwise interesting conditions ahead. Currently, information is transmitted to operators of vehicles by a number of wireless transmissions. For example, many radio stations which broadcast over frequencies that can be received by the AM/FM radio that is installed in most vehicles today, communicate at least some information relating to traffic conditions during peak travel times (i.e., "rush hours"). While such information is helpful to some people, this information is generally directed to a very large and diverse audience. Therefore, specific information and recommendations are rarely possible.

Local low power narrow casts have also been used to communication information to operators of vehicles in connection with resorts, airports, and other local areas that attract large numbers of vehicles. These transmissions are transmitted on frequencies that can be received by common AM/FM radios, but are transmitted at very low power levels to limit the range of the transmission, and thus the size of the audience. While such local transmissions may be useful in some instances, they are not interactive (i.e., they cannot receive information from vehicle, and respond to such received information).

The present invention combines the notion of a radar system which can monitor other vehicles that share the roadway, and thus improve the safety of the roadway, and the notion of an interactive message system that can receive interrogations from a vehicle borne system and respond to those interrogations to inform the operator of a vehicle of roadway and traffic conditions.

SUMMARY OF THE INVENTION

Vehicular radar systems in accordance with the invention utilize wayside transponders placed in selected locations along roadways to provide information to the vehicle. The vehicular radar system can communicate with each transponder within a time interval window representing an unused portion of each transmit and receive frame of the vehicular radar system. In this way, communication of the radar system with the transponder does not interfere with normal transmission and receipt of radar signals by the radar system.

Communication between the vehicular radar system and a wayside transponder may be in the form of multi-bit words, with the binary value of each bit being represented by one of a pair of selected frequencies. The radar system transmits at the selected frequencies in frequency shift keying fashion during the time interval window of the transmit and receive frames assigned to transponder communication. Communications from the vehicular radar system to the wayside transponder are in the form of multi-bit interrogation messages which may identify the vehicle or the type of vehicle and request the transponder to transmit certain information to the vehicular radar system. The transponder transmits the information to the vehicle in the form of multi-bit words.

In a preferred arrangement according to the invention, one or more multi-bit words, transmitted by the vehicular radar system during the time interval window assigned to transponder communications, are directed to the wayside transponder. The incoming radar transmission at the transponder is heterodyned with the output of a local oscillator to produce an intermediate frequency. The intermediate frequency signal is amplified, and applied to an FM discriminator to provide voltage amplitude samples which represent two different frequencies transmitted by the vehicular radar system, each of which denote a binary value of each of the various bits of the transmitted multi-bit word. This signal is filtered to remove the intermediate frequency.

The resulting serial data is then decoded and advanced through a shift register in preparation for evaluation by a processor. A series of preamble bits at the beginning of the multi-bit word are used to provide initial synchronization of the data decoder and the shift register. Subsequently, the predetermined widths of the assigned time interval windows are used to maintain synchronization. The amplitude samples are also integrated and the D.C. component extracted therefrom. The D.C. component is applied to tune the center frequency of the transponders radar transmitter to the same frequency, plus the intermediate frequency (IF) offset, as the vehicular radar system.

The assigned time interval windows are used to transmit the interrogating messages from the vehicular radar system to the transponder once per second. The vehicle radar transmits an interrogation message once per second to any wayside transponder in its communication range. In situations where a plurality of vehicles are simultaneously communicating with the wayside transponder, the fact that each vehicle is transmitting only once per second provides ample opportunity for each vehicle to interrogate the transponder and receive a response to such interrogations.

The information communicated to the vehicle by the wayside transponder can perform various functions such as data keeping, identifying road conditions, roadside conveniences, safety, location, speed limits, fuel and other vehicle services, and mobility. The information provided by the transponder may be fixed, or it may have portions thereof periodically updated such as via a radio telemetry data link or with a communication satellite.

BRIEF DESCRIPTION OF THE DRAWINGS

FIG. 10 comprises a plot of samples within a sample closing rate envelope illustrating phase sampling within the channels as provided by the front-end circuit of

FIG. 7.

FIG. 15A–15D are waveforms useful in explaining the operation of the arrangement of FIG. 14.

FIG. 16 is a diagrammatic representation of a multi-bit word format used in communications between the vehicle borne radar system and the wayside transponder.

Like reference numbers and designations within the various figures refer to like elements.

DETAILED DESCRIPTION OF THE INVENTION

Referring now to drawing FIGS. 1–4, an explanation of these drawings can be found in the above-referenced U.S. Pat. No. 4,673,937 assigned to the same assignee as this invention.

Figure 1:
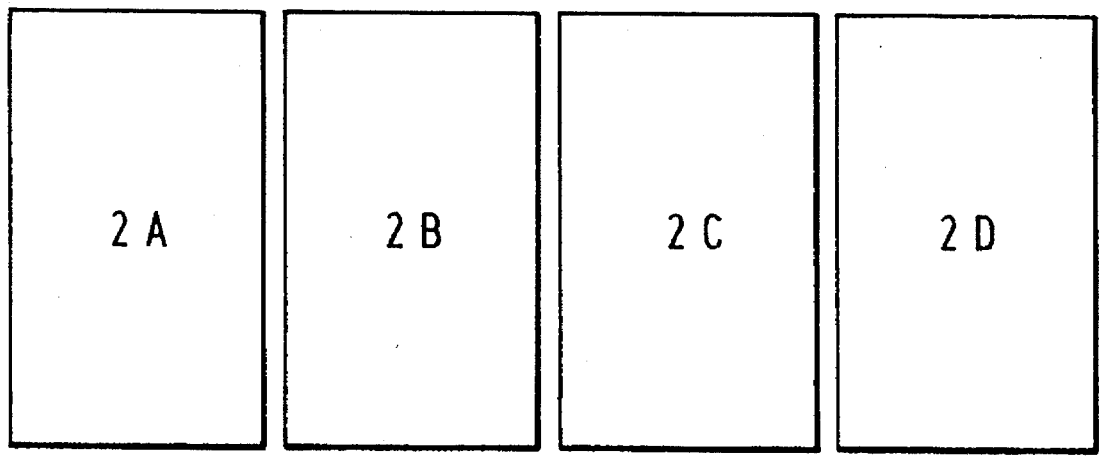
FIG. 1 depicts the relative positions of FIG. 2–4.
Figure 2:
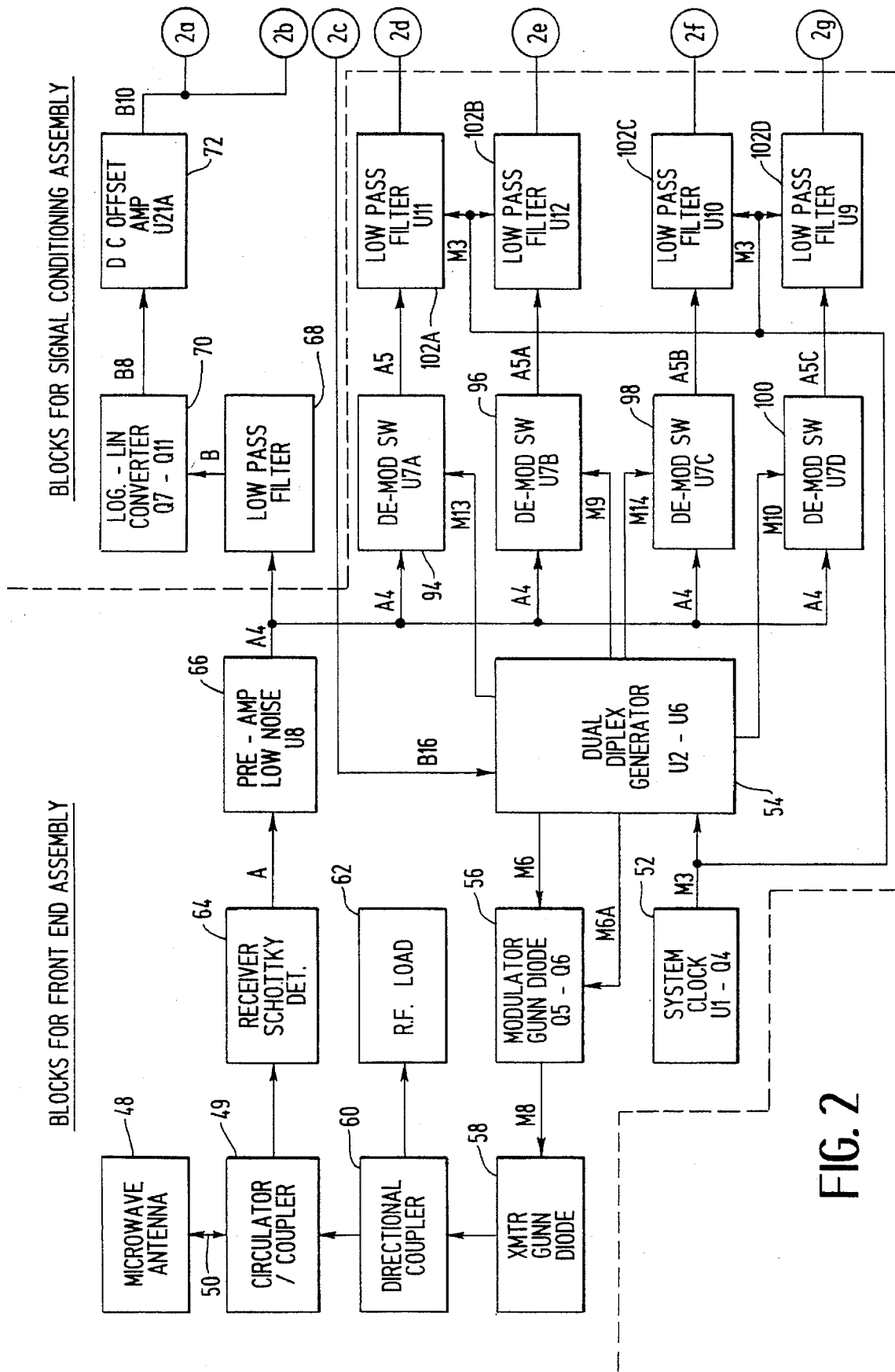
FIG. 2,3, and 4 represent a detailed block diagram of one embodiment of the present invention.

Referring now to drawing FIG. 2, the circuit of this figure is a showing of FIG. 2A of the Davis U.S. Pat. No. 4,673,937 which is modified by replacing the system clock 52 and the dual duplex generator 54 with a 3.5 Mhz clock 516, a divide by seven counter 514 and a timing generator 518 connected to the circuit as shown in drawing FIGS. 5A–5C; eliminating the low pass filter 68 and the de-mod sw 100 and the low pass filter 102D. Also A6B is connected the input B to the log-lin converters 70 and to the Doppler control channel P.

Figure 3:
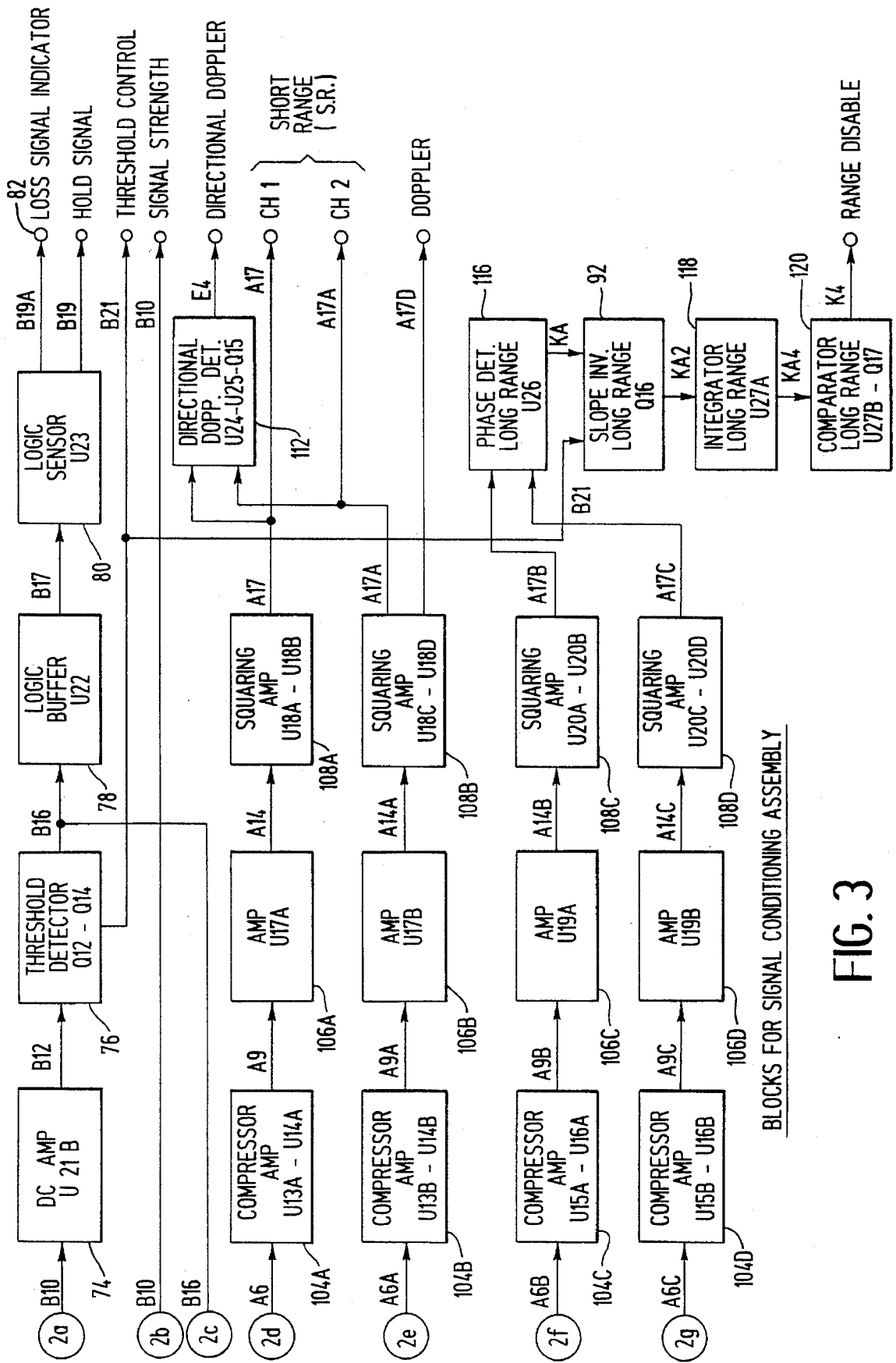

Referring now specifically to drawing FIG. 3 which is a showing of drawing FIG. 2B of the U.S. Pat. No. 4,673,937. In this drawing figure the modification includes inserting the steering bandpass filters 510 and 512, as shown in drawing FIG. 5 between compressor amps 104A and 104B;, then eliminating amps 106A, 106B, compressor amps 104C and 104D, amps 106C and 106D, squaring amps 108C and 108D, phase detector 116, slope inverter long range 92, integrator long range 118, comparator long range 120 and connecting the range disable point K4 to BB3 of drawings FIGS. 5A–5C.

Figure 4A:
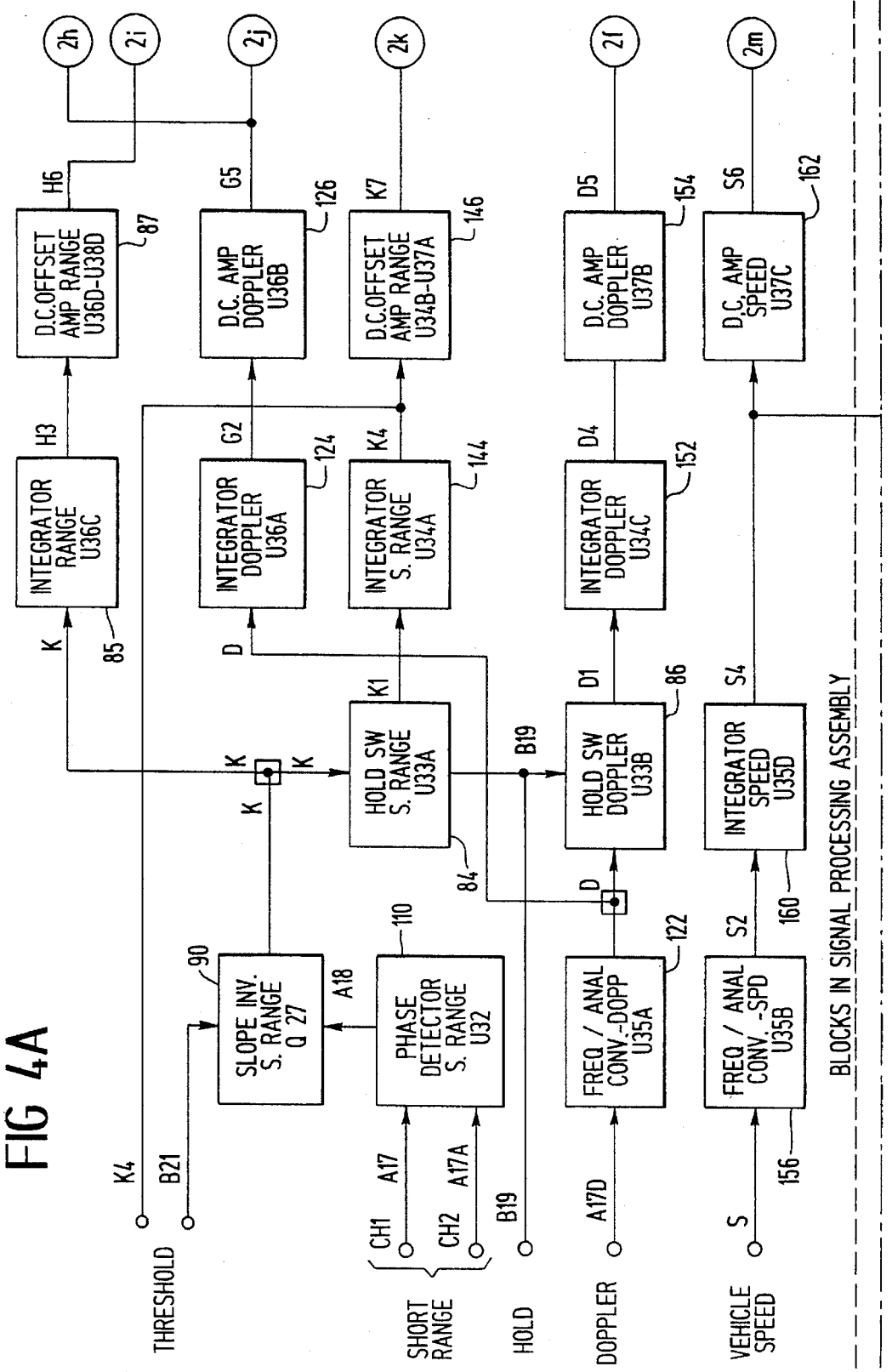

Referring now to drawing FIG. 4 which is a showing of drawing FIG. 2C of the U.S. Pat. No. 4,673,937, this portion of the latter and remaining circuits remain unchanged.

Figure 5A:
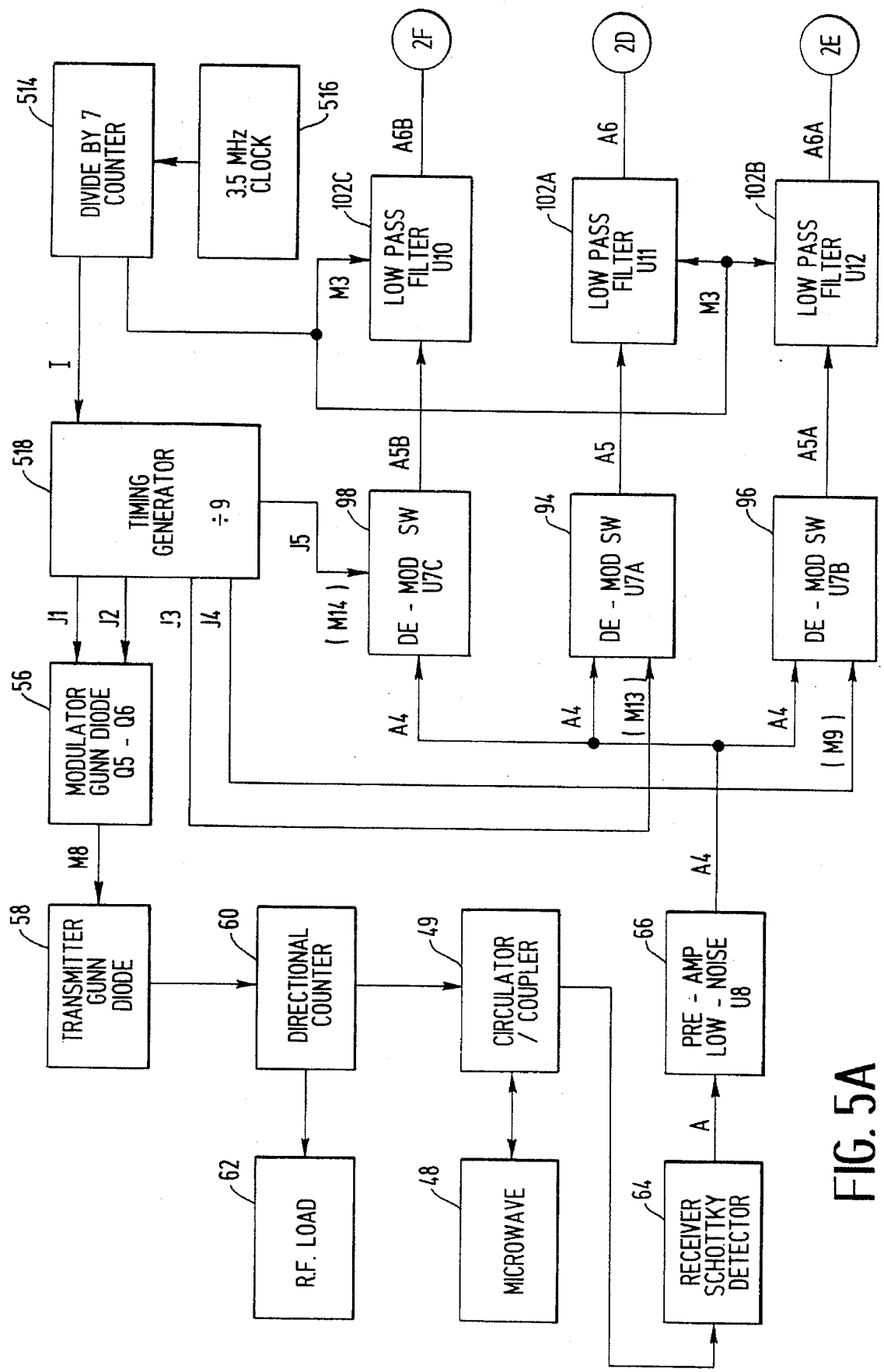
FIG. 5A, 5B, and 5C are schematic diagrams of a circuit for performing radar functions in accordance with the present invention.
Figure 5B:
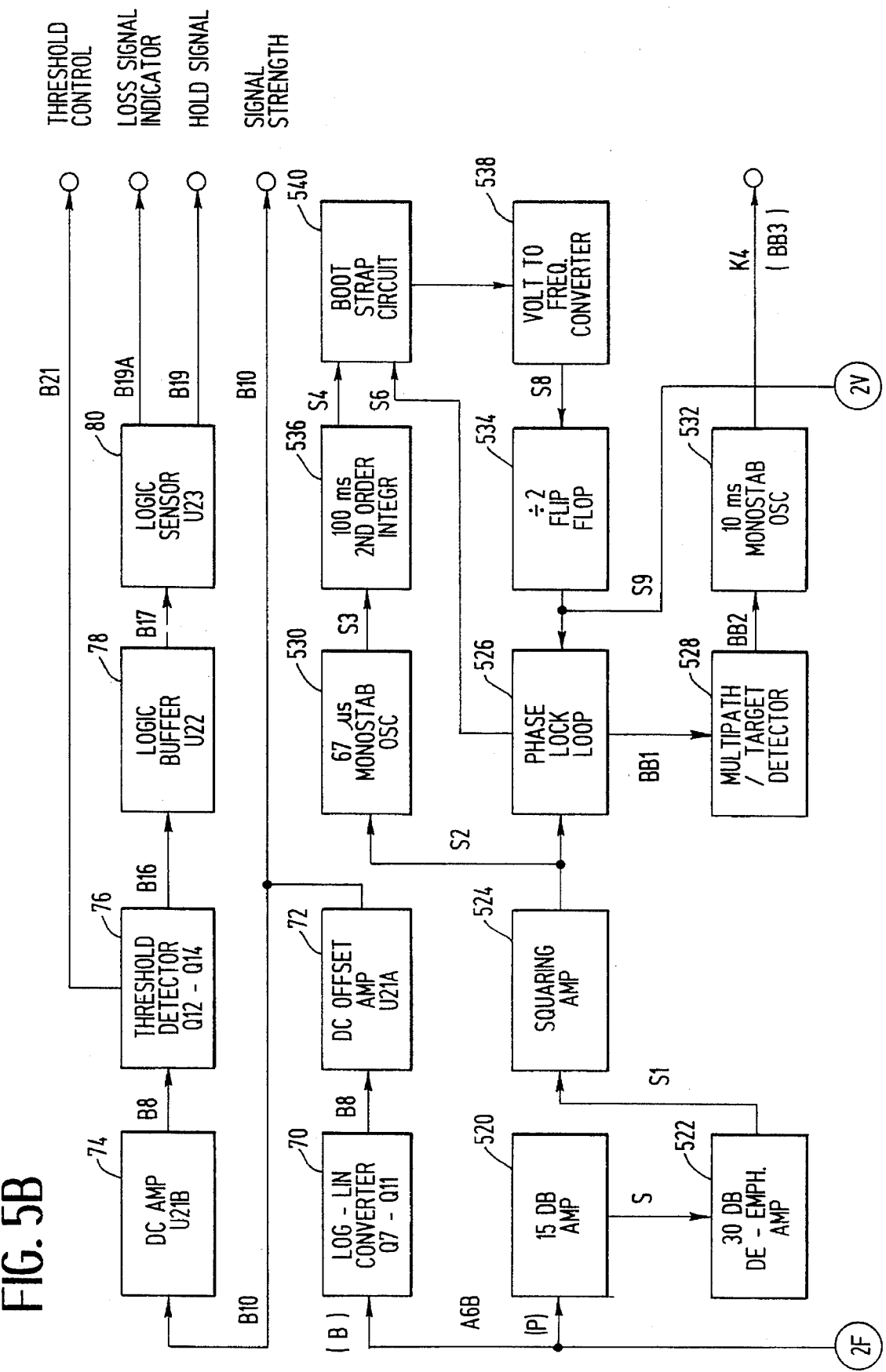
Figure 5C:
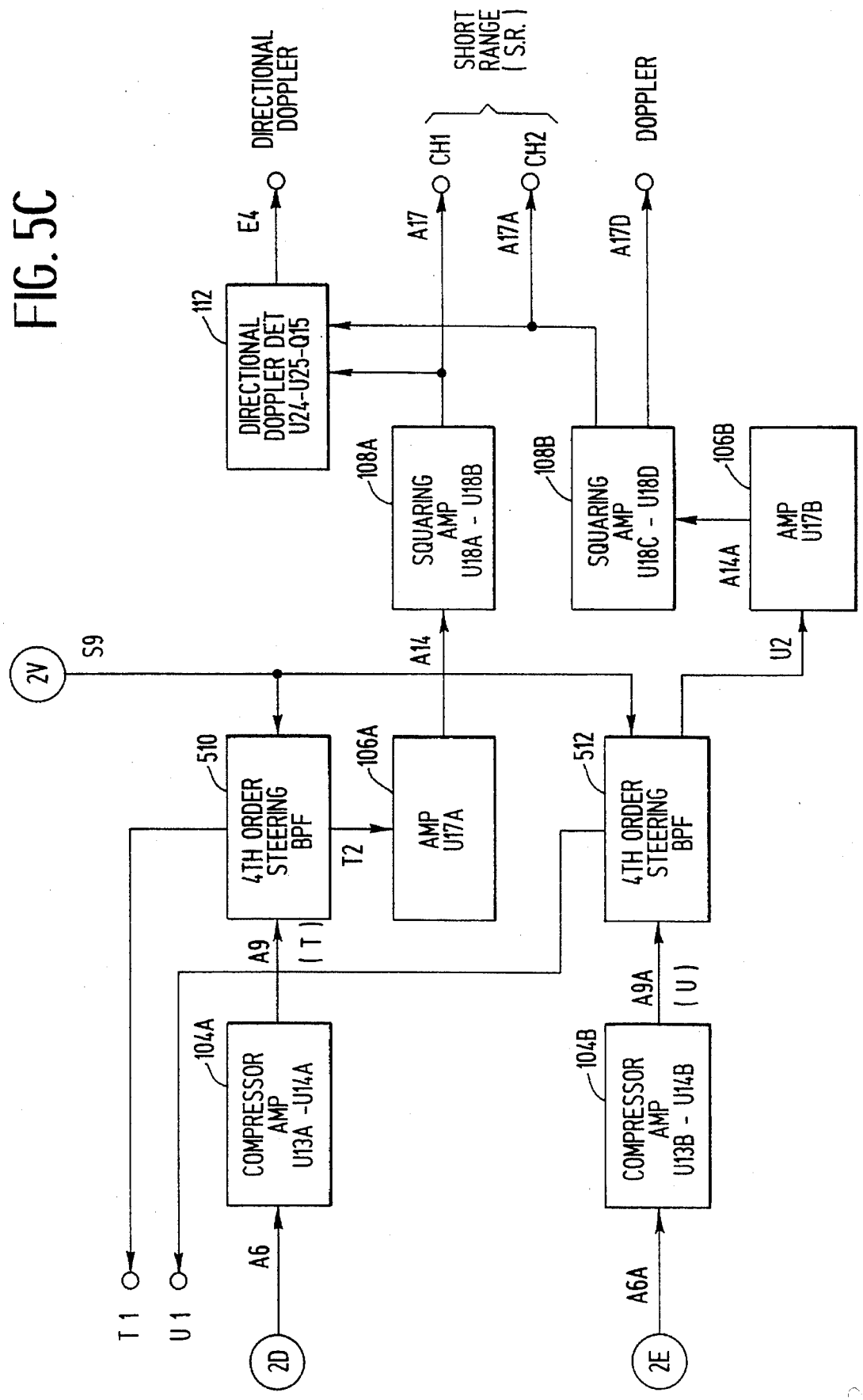

Referring now to drawing FIGS. 5A, B, C and 6, the new circuits shown include a divide by seven counter 514, a 3.5 Mhz clock 516, a timing generator 518, fourth order steering band pass filters 510 and 512, a 15 db amplifier 520, a 30 db de-emphasis amplifier 522, a squaring amplifier 524, a phase lock loop 526, a multi-path/target detector 528, a 50 microsecond monostable oscillator 530, a 10 milli-second monostable oscillator 532, a divide by 2 flip flop 534, a 100 milli-second 2nd order integrator 536, a voltage-to-frequency convertor 538 and a boot strap circuit 540. The listed new components of drawing FIGS. 5A, B and C are positioned and wired to each other and to the circuits shown in U.S. Pat. No. 4,673,937 as shown.

Figure 6:
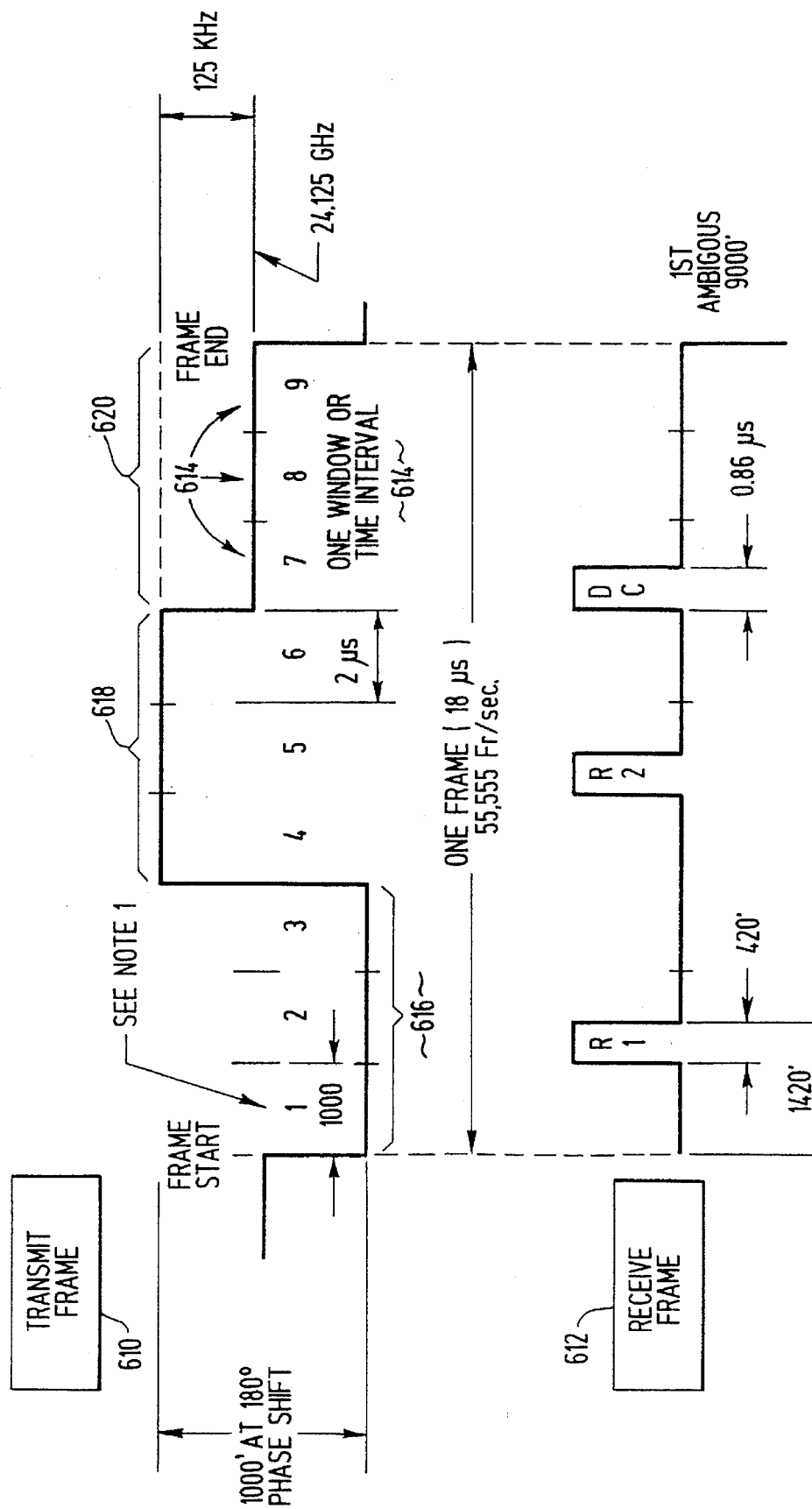
FIG. 6 shows diagrammatic representations of the transmit and receive frames used in conjunction with the circuits of FIGS. 5A, B and C, and also illustrating windowed three-frequency transmission and receipt of radar signals in accordance with the invention.

Referring now to the operation of the present invention as shown in drawing FIGS. 5 and 6, in addition to the phase, and rate of phase change (Doppler), the amplitude difference between several targets is evaluated by the Doppler control channel or circuits which includes 520–524 ("S–S2") and is used for target selection.

The amplitude of a principal or prominent target echo at the transmitter center frequency is determined in time sequence interval 7, see drawing FIG. 6. The Doppler rate of the principal target produces a proportional frequency in both range channels T and U and in the Doppler channel S. The range channels A6–A17 and A6A–A17A provide symmetrical and very accurate phase shift processing while disregarding amplitude differences. The Doppler control channel S, on the other hand, disregards phase shift but carefully preserves relative amplitude differences. It is these amplitude differences that are being used to distinguish targets, and by means of a steerable phase lock loop S2–S9 to tune the radar receiver to the most prominent target.

At the output of the Doppler control channel at S2 the frequency-to-voltage converter (FVC), consists of a one shot monostable oscillator 530 and a low pass filter 536, (well known in the art), which generate a Doppler voltage input to the bootstrap circuit 540 of the Doppler control channel.

The faster the closing rate, the higher the Doppler voltage. The Doppler voltage is 0–5 VDC, where 5 volts is equal to a Doppler rate of 200 mph. The Doppler voltage is summed with the output error voltage of the phase lock loop 526

(PLL) phase comparator "S6" and then applied, to a voltage-to-frequency converter (VFC) "S7". The frequency converter output is 128 times the Doppler frequency "S9" and is applied to the phase lock loop 526 and the two range channels T and U to tune the center frequency of the steering band pass filters (SBPFs) 510 and 512 within a frequency range of 20 Hz to 20 KHz that is proportional to a Doppler rate between 0.25 and 200 mph. The tuned band pass frequency of the SBPFs is the output frequency of the VFC 538 divided by 256 "S8" and is the frequency of the SBPF clock S9. This frequency is selected and maintained in both range channels "T2, U2" when the PLL has locked onto one of the multitude of frequencies (different targets) present in the Doppler channel "S". These frequencies results from: radar echoes from multiple targets, a signal echo returning by multiple paths, and echoes from reflecting objects that are too far away to be targets of interest. The PLL lock frequency is the frequency in the Doppler channel that has the largest amplitude "S1". This amplitude depends on the target and strength of the radar echo, which decreases as the distance to the target increases.

In this way, the range channel phase information that has been obtained from the most prominent target, is selected for further range processing by the SBPFs in the two ranging channels "T2, U2". Due to the amplitude discrimination occurring in the Doppler control channel "S1", which locks the phase lock loop to that target "S2–S9", all other target phase information is attenuated before entering the remaining range channel conditioning circuits. This Doppler control system enables the system to select or isolate a single target from many others.

Within a Doppler frequency span of between 20Hz and 20 KHz (0.25 to 200 mph) "S2", the exact tuning of the SBPF depends on the steering voltage "S7" to bring the phase lock loop into lock. This voltage "S7", in turn, is derived from the sum of the Doppler voltage "S4", and the output error voltage of the phase lock detector "S6". The use of frequency-to-voltage converters (FVC) "S2–S4" to increase the sum of the output bootstrapping of the phase lock comparator "S6" (error voltage) by the Doppler voltage, before it is applied to the VFC "S7", produces a high voltage slew rate and very fast frequency shift "S9" for rapid target selection lock.

When the phase lock loop error voltage "S6" becomes zero it also indicates target-lock condition "BB3". This also causes the steering voltage input to the VFC "S7" to stop changing. At this time, the frequency output is stabilized at 128 times "S9" the Doppler frequency "S2" of the most prominent target and is used as the clock frequency for the SBPFs. The SBPFs have then been tuned to pass the range phase information associated with the closing or opening rate of the selected target "T2, U2". The range channel differential phase information is finally applied to directional Doppler detector 112 "A17, A17A" to extract the relative direction "E4" and range to the primary target at the output of phase detector short range 110. The range voltage is 0–5 VDC, with 5 VDC=1000 feet. The differential phase shift information which may be used to identify additional targets "T1, U1" is attenuated at the output of the SBPFs in the primary target channels "T2, U2". However, the primary target frequency is removed by the notch outputs in the SBPFs "T1, U1", the remaining differential phase information can be treated in a similar way as cited previously to provide range, Doppler rate and relative direction to a second or even higher number of targets. The output frequency of the amplitude detector (Doppler control) channel "S2" is used to detect the opening/closing rate of the target.

It is first converted into a proportional steering voltage "S7" and is applied to the phase lock loop VFC converter 538. This voltage has two components. The primary one is the error voltage obtained from the phase comparator "S6", which produces a positive output voltage for inputs that have a higher frequency "S2". The second component of the steering voltage "S7" is obtained from the Doppler control channel frequency "S2". The frequency in this channel, which corresponds to the closing rate of the target, is converted to a proportional Doppler voltage "S4". This is added to the existing steering voltage "S6" so that lower closing rates will cause the PLL to slew to the frequency of the target as fast as the higher closing rates would.

As a target is acquired, the output error voltage from the phase lock loop 526 falls to zero "S6", leaving only the voltage "S4" to set the PLL phase-coherent frequency lock "S9". In the process, the output of the Doppler channel "S1" becomes a square wave "S2" with a repetition rate proportional to the closing rate. This square wave triggers a one shot multivibrator 530 to produce a variable duty-cycle width pulse train "S3" which is then integrated into a D.C. voltage "S4".

The amplitude of the D.C. voltage "S4" is dependent on how long the pulses are allowed to discharge the integrator 536 before another impulse charges it, i.e., the pulse recurrence frequency. On slow moving targets, the D.C. voltage is much lower than on fast moving ones. The D.C. voltage varies linearly from 0 to 5 volts "S4" and is proportional to the relative velocity of the target from 1 to 200 mph.

The remainder of the circuits of the U.S. Pat. No. 4,673,937 function as explained in the patent.

Figure 7:
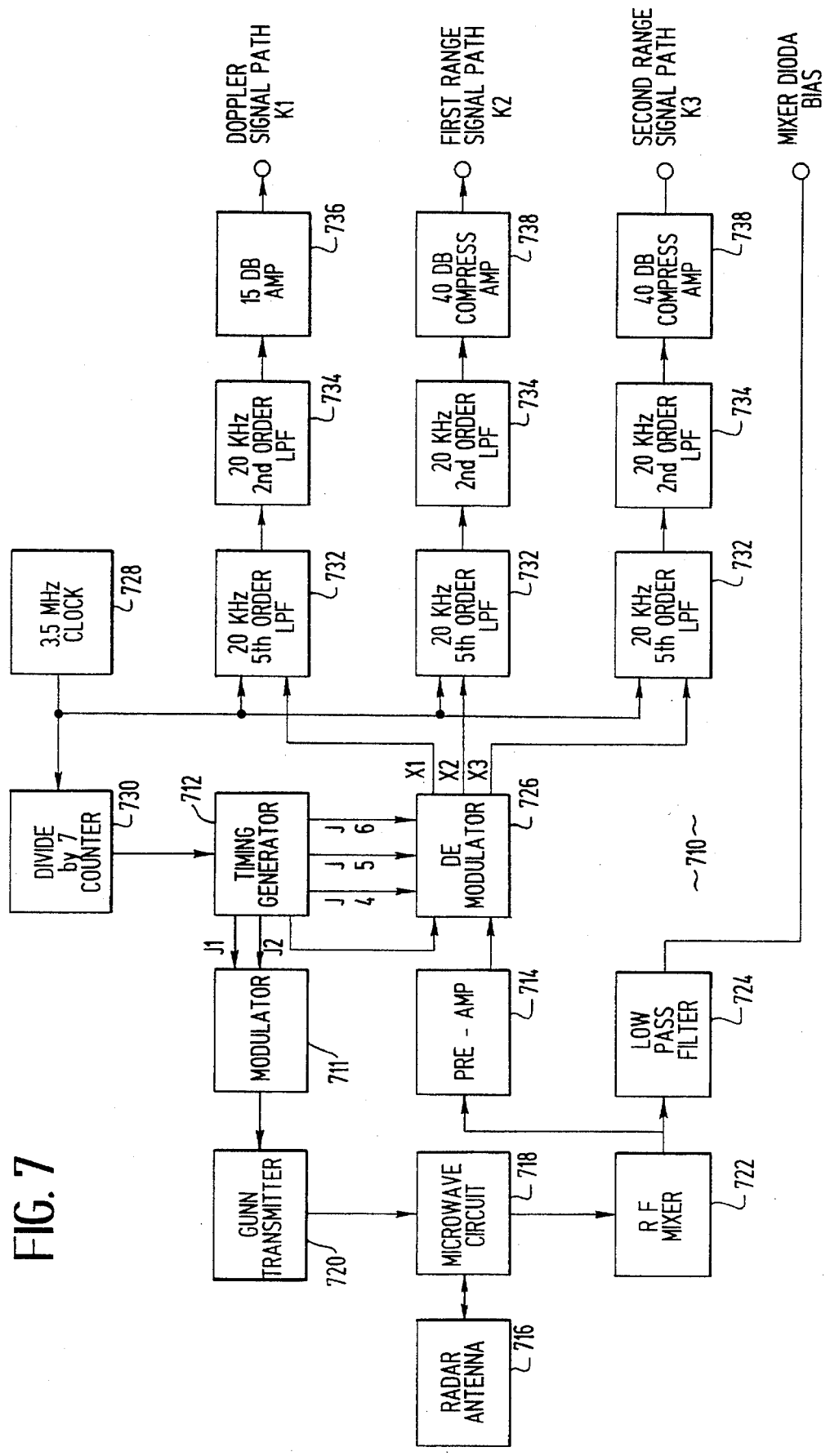
FIG. 7 is a block diagram of the front-end circuit of a radar system using the windowed three-frequency frames of FIG. 6.

A further example of a radar system which utilizes the waveforms of FIG. 6 includes a front-end circuit 710 shown in FIG. 7. As described hereafter in connection with FIGS. 7–11, such circuits respond to received signals at the three different frequencies to determine desired information, including closing rate and range. In addition, the circuitry of such system divides each transmit frame and each receive frame into a plurality of different time interval windows, as shown in FIG. 6. Only certain ones of the plurality of windows are utilized in connection with the receipt of the transmitted radar signals at the three different frequencies. Consequently, the remaining windows comprising time space which would otherwise be wasted can be utilized to perform other functions such as those performed by subsystems in conjunction with the radar system.

As shown in FIG. 6, a transmit frame 610 and a corresponding receive frame 612 are each 18 μs in length in the present example. Consequently, a succession of 55,555 such frames occurs during each second. The transmit frame 610 and the receive frame 612 are divided into nine windows 614 comprising time intervals of equal length. Consequently, each window 614 is 2 μs in duration. If the transmit frame 610 and the receive frame 612 are related to the distance traveled by the transmitted radar signals with reference to the time scale thereof, then each of the transmit and receive frames 610 and 612 corresponds to 9,000' extending from the transmitter, and each of the windows 614 corresponds to a distance of 1,000 feet.

The transmit frame 610 is comprised of three different frequency intervals 616, 618 and 620. A continuously generated radar signal is transmitted at each of the three different frequencies during the frequency intervals 616, 618 and 620. This is accomplished by frequency switching on a time division basis, using a center frequency of 24.125 GHz. A first frequency which is a fixed amount of 0.000250 GHz less than the center frequency, or 24.124750 GHz, is used during the first frequency interval 616. As shown in FIG. 6, the first frequency interval 616 encompasses the first three of nine of the windows 614 which extend along the transmit frame 610 and the receive frame 612. The second and third frequency intervals 618 and 620 encompass the fourth through the sixth and the seventh through the ninth ones of the windows 614, respectively.

Radar signals transmitted at the first frequency and reflected back or echoed by the target are detected within a receive interval R1 within the receive frame 612 as shown in FIG. 6. The interval R1 which commences at the beginning of the second window 614 is shorter than the second window, and has a length which translates into a ground distance of 420'. Because the first frequency is received during the interval R1 which occurs within the second one of the windows 614, the first and third ones of the windows 614 within the first frequency interval 616 are freed for use with other systems.

The second frequency is transmitted during the second frequency interval 618 which encompasses the fourth through the sixth ones of the windows 614. The second frequency is determined by adding the fixed amount of 0.000250 GHz to the center frequency of 24.125 GHz. Accordingly, the second frequency is at 24.125250 GHz.

The second frequency is detected during a receive interval R2 which commences at the beginning of the fifth window 614. Like the interval R1, the interval R2 has a duration considerably shorter than that of the fifth window and corresponding to 420' of ground distance. The actual time length of the intervals R1 and R2 is 0.86 μs. By receiving the second frequency within the fifth window, the fourth and sixth windows 614 are freed for other uses.

The third frequency which is the center frequency of 24.125 GHz is transmitted during the third frequency interval 620 comprising the seventh, eighth and ninth windows 614. The third frequency is detected within a DC (Doppler channel) receive interval which commences at the beginning of the seventh window. As in the case of the intervals R1 and R2, the interval DC has a time duration of 0.86 μs corresponding to a ground distance of 420'. Because the third frequency is received within the seventh window, the eighth and ninth windows 614 are freed for other uses.

The front-end circuit 710 shown in FIG. 7 is employed to transmit and receive radar signals at the three different frequencies and to define the transmit and receive frames 610 and 612 shown in FIG. 6. Among other things, the front-end circuit 710 functions to pre-amplify the target echo signals received back from the target, to phase shift sample the de-modulated target echo signals, to modulate the transmitter output frequency, to select the demodulator/receiver channel, and to amplitude discriminate the target echo signals.

A modulator 712 which provides signals defining the radar transmission is controlled by a timing generator 712. The timing generator 712 digitally controls the modulator 710 through enter frequency modulation signals J1 and J2, by frequency shift keying the modulator 710 and by synchronous and sequential switching of the received echo signals J3, J4, J5 and J6 into each of three different receiver/demodulation channels K1, K2 and K3. The timing generator 712 functions to define the transmit and receive frames 610 and 612 of FIG. 6, as described hereafter.

The front-end circuit 71 0 also includes a pre-amplifier 714 and low pass filters for the channels K1, K2 and K3 which integrate the short sampling output pulses in each channel into continuous sine waves for all targets within the beam width of a radar antenna 716. The radar antenna 716 is associated with microwave circuits 718 which are coupled to receive transmission signals from a radar transmitter in the form of a Gunn diode transmitter 720, coupled to the modulator 710. The signals received by the radar antenna 716 as reflected back from a target are coupled by the microwave circuits 718 through an RF mixer 722 to the pre-amplifier 714 and to a low pass filter 724 to provide a mixer diode bias. The pre-amplifier 714 is coupled to the three receiver demodulation channels K1, K2 and K3 through a demodulator 726 which is controlled by the timing signals J3–J6 from the timing generator 712. The timing generator 712 is supplied by a 3.5 MHz clock 728 through a divide by seven counter 730. The 3.5 MHz clock 728 also feeds a 20 KHz fifth order low pass filter (LPF) 732 within each of the receiver demodulation channels K1–K3.

The Gunn transmitter 720, which is of the continuous wave (CVV) diode type, has its frequency changed in a specific sequence of three frequency shift keying intervals within each transmit frame 610 shown in FIG. 6. As shown in FIG. 6, the sequence is comprised of the first frequency of 24.124750 GHz during the first frequency interval 616, followed by the second frequency of 24.125250 GHz during the second frequency interval 618, and then the third frequency of 24.125 GHz during the third frequency interval 620. The echo signals received from the target by the radar antenna 716 and provided by the microwave circuits 718 to the RF mixer 722 are combined in the same sequence J1–J6 as the transmitter frequencies are shifted, to distinguish the phase change at each of the three frequencies transmitted and received within a frame. The difference in phase shift between the first range channel K2 and the second range channel K3 is an indication of the distance or range to the target. The rate of phase shift (frequency) in the channel K1 which comprises a Doppler control channel is an indication of the opening or closing rate of the target. The Doppler frequency is in the audio frequency spectrum of 20 Hz–14KHz.

In addition to the 20 KHz 5th order low pass filter 732, the Doppler channel K1 also includes a 20 KHz 2nd order low pass filter 734, as do the first and second range channels K2 and K3. The output of the 20 KHz 2nd order low pass filter 734 within the Doppler channel K1 is coupled through a 15 db amplifier 736. The 20 KHz 2nd order low pass filters 734 within the first and second range channels K2 and K3 are coupled through a 40 db compression amplifier 738.

Figure 8:
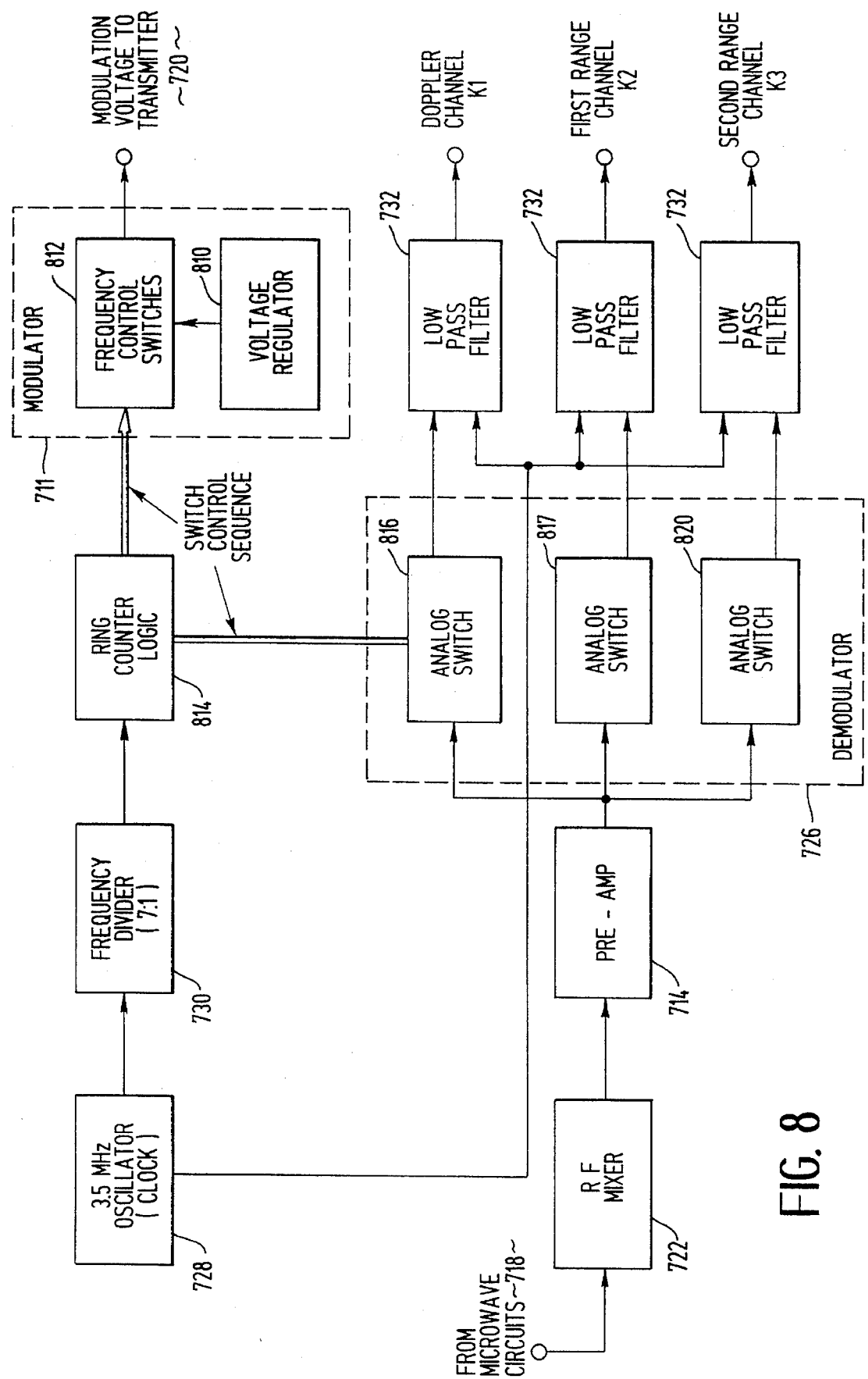
FIG. 8 is a somewhat more detailed block diagram of a portion of the front-end circuit of FIG. 7.

FIG. 8 is a somewhat more detailed showing of a portion of the front-end circuit 710 of FIG. 7. As described in connection with FIG. 7, the Gunn transmitter 720 provides the three frequencies of the transmit frame 610 in response to the modulator 710. The modulator 710 is shown in FIG. 8 as comprising a voltage regulator 810 and frequency control switches 812. The timing generator 712 of FIG. 7 comprises a ring counter logic circuit 814 which is coupled to provide timing control signals to the switches 812 as well as to the demodulator 726. The ring counter logic 814 is also coupled to the divide by seven counter 730 which, as noted in connection with FIG. 7, is coupled to the 3.5 MHz clock 728. As shown in FIG. 8, the 3.5 MHz clock 728 comprises a 3.5 MHz oscillator, and the divide by seven counter 730 comprises a 7:1 frequency divider.

The voltage regulator 810 shown in FIG. 8, and which has a stable +5.0 volt output, is coupled to the diode of the Gunn transmitter 720. The Gunn diode of the Gunn transmitter 720 functions as the transmitter oscillator, and its frequency is dependent on the voltage applied thereto. To control the frequency provided by the Gunn transmitter 720, the current into the Gunn diode, which is typically 145 ma, is sequentially increased under control of the timing signals J1 and J2 shown in FIG. 7. As the current is increased, the resulting voltage drop changes the frequency of the Gunn transmitter 720 accordingly.

A portion of the circuit of FIG. 8 functions as a phase shift sampling circuit, to route samples of the received target echo signals to the Doppler channel K1, the first range channel K2 and the second range channel K3. This routing occurs during a portion of the time when the Gunn transmitter 720 is transmitting the frequency intended for one of the channels K1, K2 and K3. The ring counter logic 814 controls the voltage applied to the diode of the Gunn transmitter 720, and thereby the frequency produced by the transmitter 720. The frequency divider 730 divides the 3.5 MHz frequency of the oscillator 728 by seven to provide a frequency of 500 KHz which is applied to the ring counter 814. This produces a positive output pulse sequentially at each of nine output pins of the ring counter 814. Three of the outputs are ORed together to provide the signal J2, and three other outputs are ORed together to provide the signal J1. Additional logic circuits within the ring logic counter logic 814 provide the remaining timing gate signals J3–J6 as described in connection with FIG. 7. The timing gate signals J3–J6 control analog switches 816, 818 and 820 within the demodulator 726, thereby routing the target echo signals to the appropriate channel K1, K2 or K3.

As the ring counter logic 814 is controlling the frequency of the Gunn transmitter 720, it simultaneously generates the three sequential enable gates J4, J5 and J6 which are 0.86 μs in duration and which correspond to the receive intervals R1, R2 and DC, respectively, in the receiver frame 612 shown in FIG. 6. Generation of the enable gates J4, J5 and J6 is delayed following the switching of the frequency of the Gunn transmitter 720 at the beginning of the respective windows 614 therefor long enough so that any frequency transients which result from the frequency change of the Gunn transmitter 720 do not interfere with accurate reception of the relatively weak target reflection or echo signals. When one of the enable gates J4, J5 and J6 is present, the output of the pre-amplifier 714 is coupled by a corresponding one of the analog switches, 816, 818 and 820 to the associated one of the low pass filters 732.

Figure 9:
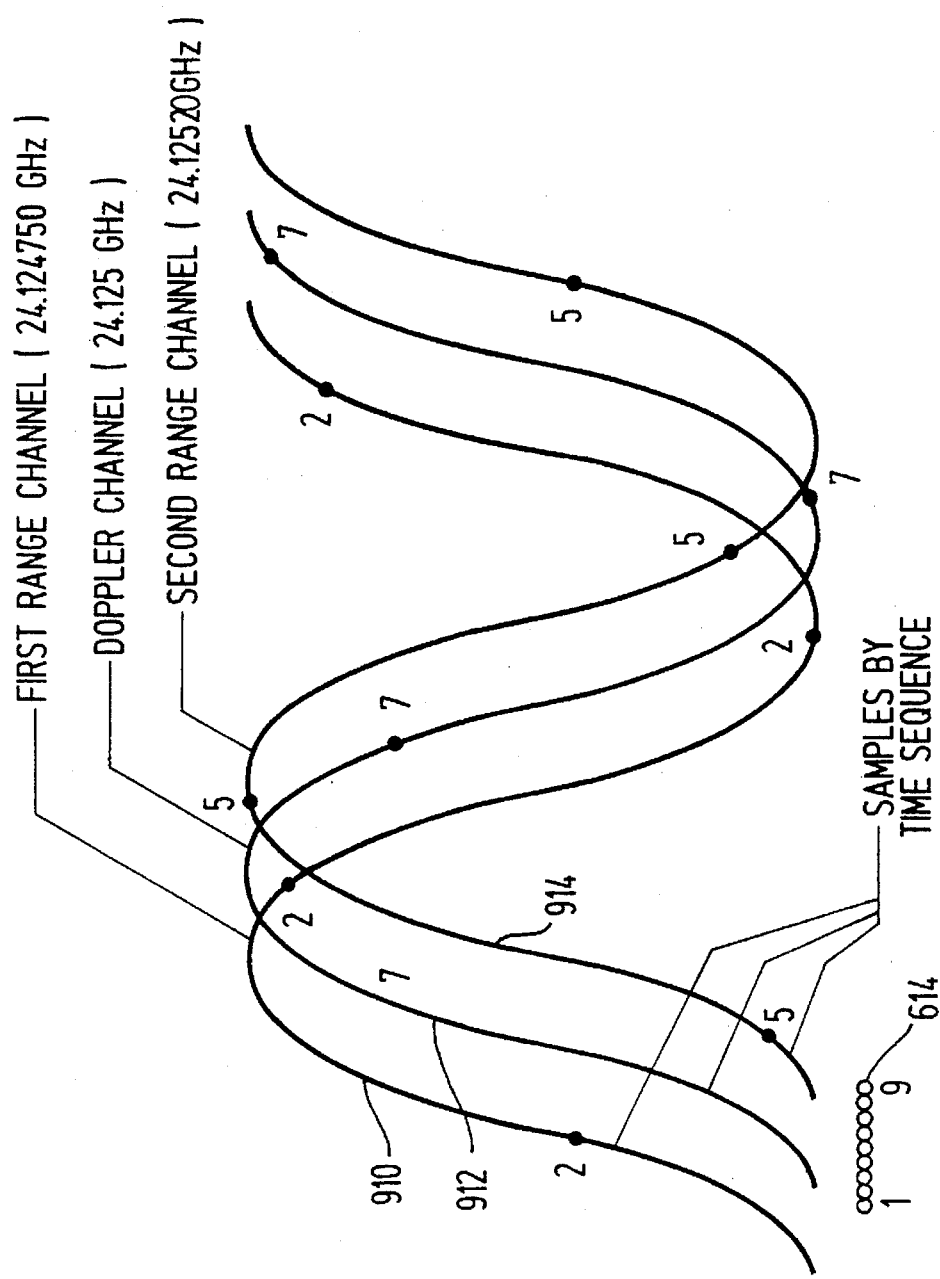
FIG. 9 comprises waveforms illustrating the sampling of phase shifts within different channels as provided by the front-end circuit of FIG. 7.

FIG. 9 illustrates the manner in which the phase shifts may be sampled using the three different frequencies of the transmitted and received signals. A first curve 910 corresponds to the first frequency (24.124750 GHz) which is used in conjunction with the first range channel K2. A second curve 912 corresponds to the third frequency (24.125 GHz) of the Doppler channel K1. A third curve 914 corresponds to the second frequency (24.125250 GHz) of the second range channel K3. The curves 910, 912 and 914 are referenced to time, with the nine windows 614 of one of the 18 μs frames being illustrated along a portion of the horizontal time axis.

When the transmitter frequency is changed, the phase shift of the energy reflected from the target is sampled. Reflected energy during the receive interval R1 at the beginning of the second window is routed to the first range channel K2. During the receive interval R2 at the beginning of the fifth window, and with the transmitter sending at 24.125250 GHz, received energy is routed to the second range channel K3. During the receive interval DC at the beginning of the seventh window, with the transmitter at the third frequency 24.125 GHz, reflected energy is routed to the Doppler channel K1. The difference in phase shift between the first and second range channels K2 and K3 is linearly proportional to the range of the target vehicle from the transmitter.

As previously noted in connection with FIG. 6, the transmit and receive frames 610 and 612 are 18 μs in length. Such frame length therefore has a first target ambiguous range of 9,000' or nearly two miles, and at 9,000' multiples thereafter as the frame is repeated. Use of ranges beyond 9,000' are usually only possible under ideal conditions, such as with a very large object oriented centrally in the antenna beam width, such as in the case of a high rise building, and with no other targets in the first 420' in front of the vehicle radar system. The probability of this happening, with only a half milliwatt of power being transmitted, is extremely low.

Figure 10:
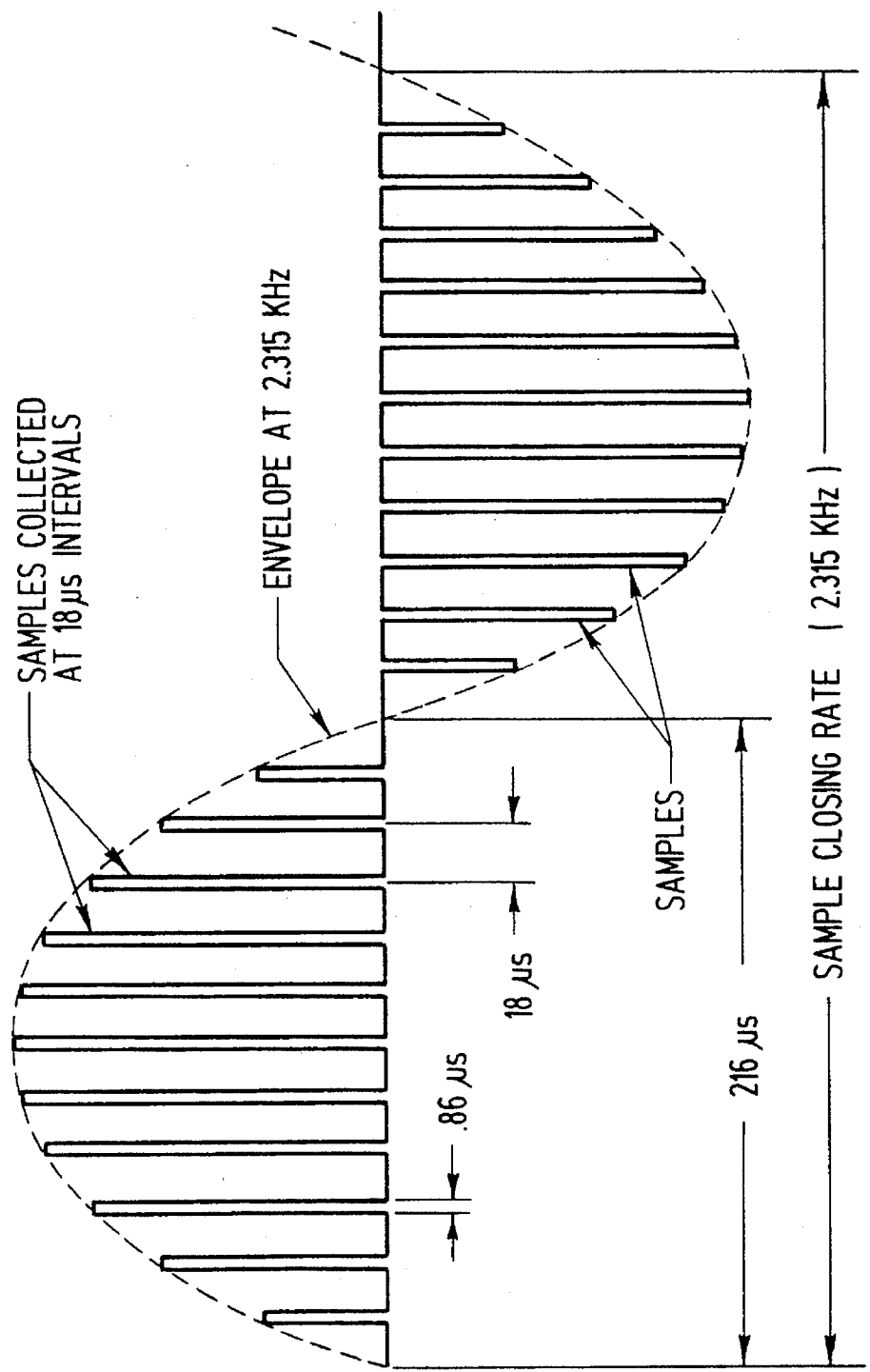

FIG. 10 further helps to illustrate the phase sampling of the three different channels K1, K2 and K3. FIG. 10 is a plot with respect to time which illustrates samples collected at 18 μs intervals. An exemplary envelope at 2.315 KHz is shown, corresponding to a closing rate of 2.315 KHz.

As previously noted in connection with FIG. 7, the first and second range channels K2 and K3 include the 40 db compressor amplifiers 738. The amplifiers 738 reduce the dynamic amplitude range between weak and strong target echoes which have a dynamic voltage range of 1 to 10,000 (80 db). The compressor amplifiers 738 reduce the dynamic range to 1–100 (40 db) so as to maintain signal purity without distortion. Without the compressor amplifiers 738, the system would miss weaker targets or saturate on strong targets. The compressor amplifiers 738 comprise operational amplifiers with feedback loops. A compressor amplifier is not used in the Doppler channel K1, inasmuch as amplitude differences between targets should not be reduced in that channel. Such amplitude differences are used to distinguish one target from another.

Figure 11A:
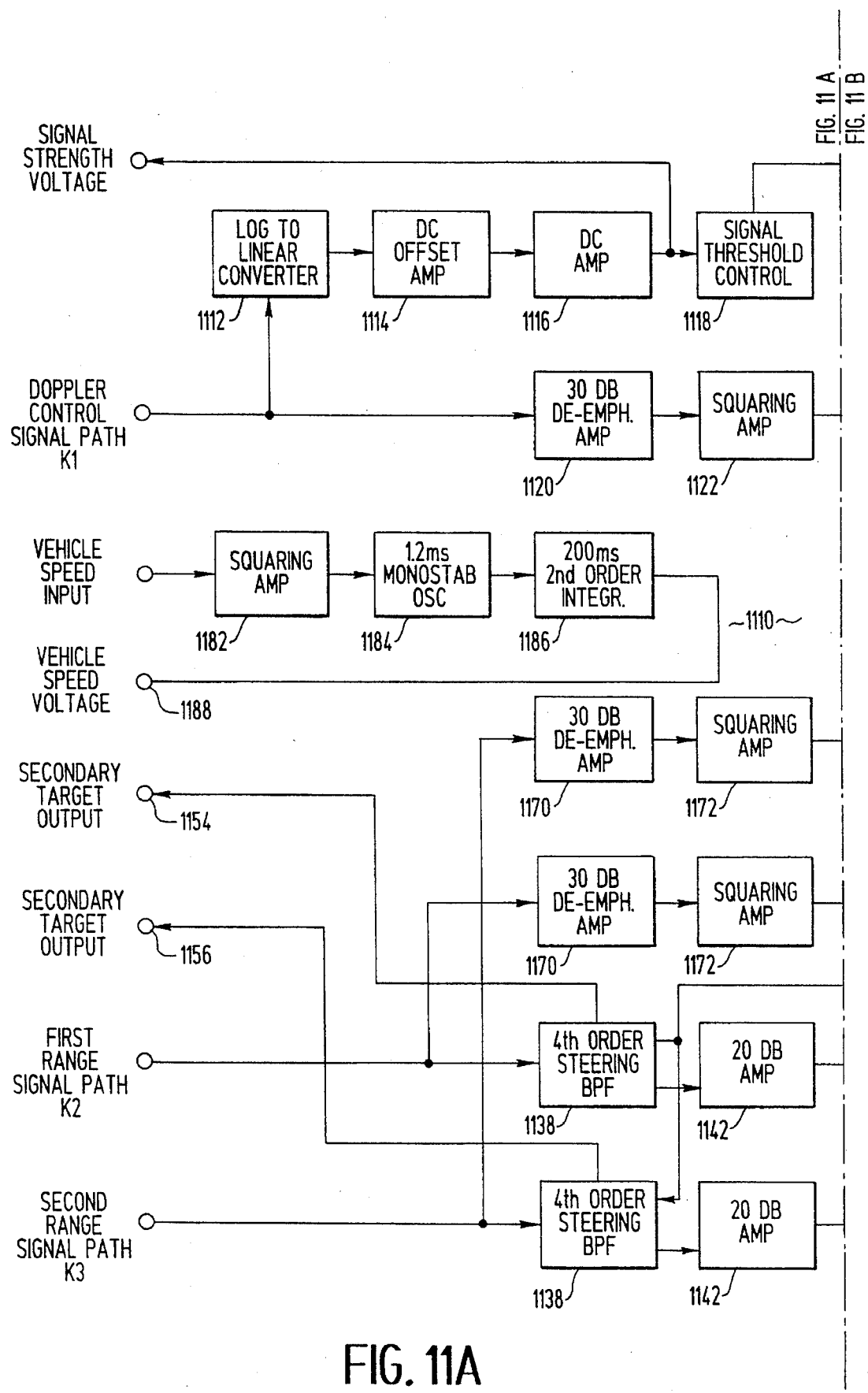
FIG. 11 is a block diagram of a signal conditioning circuit for use with the front-end circuit of FIG. 7.
Figure 11B:
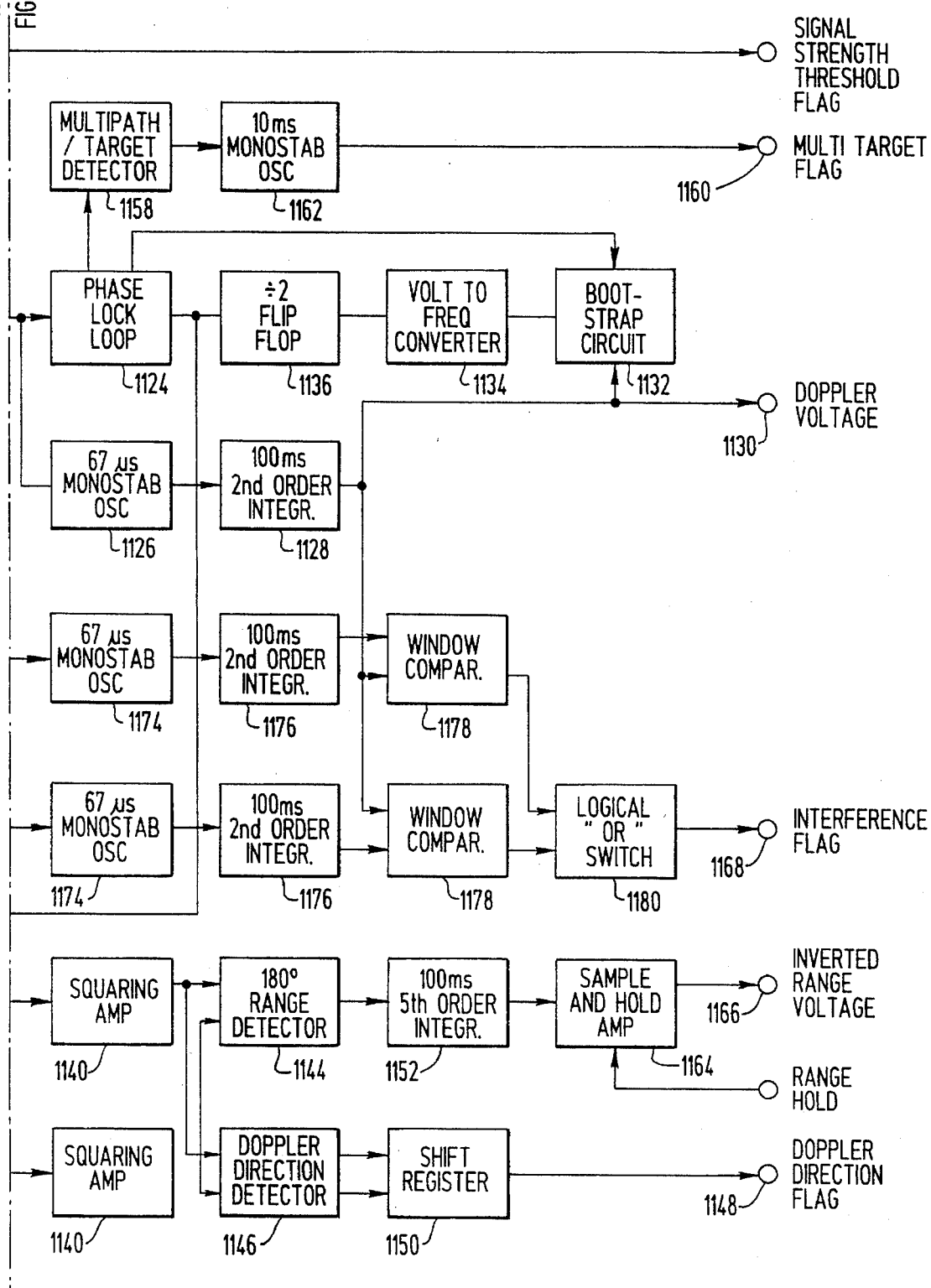

FIG. 11 shows a signal conditioner circuit 1110 which is used with the front-end circuit 710 of FIG. 7. The signal conditioner circuit 1110 functions to take the raw signals from the Doppler channel K1 and the first and second range channels K2 and K3 of the front-end circuit 710, along with a signal representing the speed of the vehicle, and process such signals into voltages proportional to range, closing rate, signal strength and vehicle speed. These voltages, along with several binary flags also generated by the signal conditioner circuit 1110, are then output to a data processor for further processing and evaluation. The signal conditioner circuit 1110 includes circuitry which measures the relative strength of the reflected or echo radar signals and produces a D.C. output voltage logarithmically proportional to the strength of such signal. Such circuitry includes a cascade of logarithmic amplifiers forming a log to linear converter 1112, a D.C. offset amplifier 1114 and a D.C. amplifier 1116. The logarithmic amplifiers comprising the log to linear converter 1112 provide currents which vary 20 db over a signal amplitude range of 10. The voltage at the output of the converter 1112 therefore varies by a factor of 80 when the signal varies by a factor of 10,000. This voltage is filtered by the D.C. offset amplifier 1114 and amplified by the D.C. amplifier 1116 before being applied to a signal threshold control circuit 1118. The output of the D.C. amp 1116 also provides a signal strength voltage which can be used in the data processor described hereafter. The output of the signal threshold control circuit 1118 goes high (logically) whenever the received signal is too weak to process (approximately 8 db above the system noise floor).

The output of the Doppler channel K1 in the front-end circuit 710 of FIG. 7 is applied to a Doppler control channel portion of the signal conditioner circuit 1110, which processes the raw Doppler channel signal and outputs it as a D.C. voltage proportional to the speed difference between the vehicle and the target. The amplitude of the received signal at the third frequency of the transmitter is determined within the seventh window of each receive frame, as previously described. The Doppler rate of the principal target produces a proportional frequency in both range channels K2 and K3 and in the Doppler channel K1. The range channels K2 and K3 provide symmetrical and highly accurate phase shift processing while disregarding amplitude differences. The Doppler channel K1, on the other hand, disregards phase shift but carefully preserves relative amplitude differences. Such amplitude differences are used to distinguish targets and to tune the radar receiver to a particular target using a steerable phase lock loop. The signal conditioner circuit 1110 includes a continuation of the Doppler channel K1. The Doppler channel K1 includes a 30 db De-emphasis Amplifier 1120 which is coupled through a squaring amplifier 1122 to a phase lock loop 1124 and to a 50 µs monostable oscillator 1126. The oscillator 1126 acts as a frequency to voltage converter preceding a 100 ms 2nd order integrator 1128 which acts as a low pass filter to produce a Doppler voltage at an output terminal 1130 and to a bootstrap circuit 1132. The bootstrap circuit 1132 forms a part of a phase lock loop circuit together with the phase lock loop 1124, a voltage to frequency converter 1134 and a +2 flip flop 1136.

The greater the closing rate of the vehicle onto the target, the higher the Doppler voltage. The Doppler voltage is in the range of 0–5 volts D.C., with 5 volts representing a closing rate of 200 mph. The Doppler voltage is added to an output error voltage of the phase lock loop 1124 by the bootstrap circuit 1132, and then applied to the voltage to frequency converter 1134. The output of the voltage to frequency converter 1134, which has a frequency 128 times the Doppler frequency, is applied by the +2 flip flop 1136 to 4th order steering bandpass filters 1138 within each of the first and second range channels K2 and K3. This tunes the center frequency of the 4th order steering bandpass filters 1138 within a frequency range of 20 Hz to 14.4 KHz to a frequency that is proportional to a closing rate of between 1 mph and 200 mph. The tuned bandpass frequency of the bandpass filters 1138, which is the output frequency of the voltage to frequency converter 1134, is divided by 128 times the clock frequency of the bandpass filters 1138. This frequency is selected and maintained in both range channels K2 and K3 when the phase lock loop 1124 has locked onto one of the various frequencies of the differences targets present in the Doppler channel K1. The various frequencies result from radar echoes from multiple targets, a signal echo returning by multiple paths, and echoes from reflecting objects that are too far away to be targets of interest. The lock frequency of the phase lock loop 1124 is the frequency in the Doppler channel K1 that has the largest amplitude. This amplitude depends on the strength of the target radar echo which decreases as the distance to the target increases.

In this way, the range channel phase information which is selected to correspond to the most prominent target in the Doppler channel K1, is separated from other target phase information by the 4th order steering bandpass filters 1138 and is provided to squaring amplifiers 1140 via 20 db amplifiers 1142 for further processing. The Doppler channel K1 provides an amplitude discrimination function by driving the phase lock loop 1124 to recognize the strongest target. All other phase information relating to irrelevant targets is attenuated before entering the conditioning circuit of the first and second range channels K2 and K3. This Doppler control scheme thus enables the system to select or isolate a single target to the exclusion of many others.

Within a Doppler frequency span of 20 Hz–14.4 KHz (0.25 mph to 200 mph), the exact tuning of the 4th order steering bandpass filters 1138 depends on the steering voltage from the bootstrap circuit 1132 to lock the phase lock loop 1124. The voltage produced by the bootstrap circuit 1132 is derived by summing the Doppler voltage at the terminal 1130, and the output error voltage of the phase lock loop 1124. The use of frequency to voltage conversion to increase the sum of the output strapping of the phase lock error voltage by the Doppler voltage before it is applied to the voltage to frequency converter 1134 produces a high voltage slew rate and very fast frequency shift at the output of the +2 flip flop 1136 for rapid target selection lock.

As a target is acquired, the error voltage from the phase lock loop 1124 reduces to zero to indicate a target-lock. This also causes the steering voltage input to the voltage to frequency converter 1134 to stop changing. The output frequency is stabilized at 128 times the Doppler frequency of the most prominent target, thereby determining the clock frequency for the 4th order steering bandpass filters 1138. The bandpass filters 1138 have been tuned to pass the range phase information associated with the closing or opening rate of the selected target. The range channel differential phase information is applied to comparators formed by a 180° range detector 1144 and a Doppler direction detector 1146 to extract the relative direction which is indicated at a terminal 1148 at the output of a shift register 1150, and to provide the range via a 100 ms 5th order integrator 1152. The range voltage varies from 0–5 volts D.C., with 5 volts representing a range distance of 1000 feet. The differential phase shift information may be used to identify additional targets, such as at terminals 1154 and 1156 through attenuation of the 4th order steering bandpass filters 1138. However, the primary target frequency is removed by notch outputs in the bandpass filters 1138. The remaining differential phase information at the terminals 1154 and 1156 can be treated in a similar way, to provide range and relative direction to a second or even higher number of targets.

Occasionally, the phase lock loop 1124 may not lock. This may be due to such things as the absence of a target or the reception of multiple echoes of a single target which have followed different routes in returning to the vehicles radar system. When this situation occurs, an output of the phase lock loop 1124 is filtered and a D.C. average produced by a multipath/target detector 1158 is compared to a threshold value, and a multitarget flag signal is provided at a terminal 1160 at the output of a 10 ms monostable oscillator 1162.

Among other things, it is necessary to determine the direction of a target; namely, whether the target is approaching or moving away from the vehicle. Normally, the phase shift in the first range channel K2 at the output of the squaring amplifier 1140 leads the output of the squaring amplifier 1140 in the second range channel K3. This is due to the transmitter frequency being higher when the target echo is being sampled in the first range channel K2 than when it is sampled in the second range channel K3. The phase-shifted sine waves at the outputs of the 20 db amplifiers 1142 are squared by the squaring amplifiers 1140 and are fed to a D-type flip flop within the Doppler direction detector 1146. The signal at the output of the squaring amplifier 1140 in the first range channel K2 is used to clock in the signal at the output of the squaring amplifier 1140 within the second range channel K3 to the D-input of the flip flop. If the signal within the first range channel K2 leads the signal within the second range channel K3, the output of the flip flop is set to be high. If not, the output is set to be low. The signal in the first range channel K2 also clocks the output of the flip flop into a 64 bit shift register comprising the shift register 1150. If the flip flop remains set for 65 successive cycles of the signal in the first range channel K2, the phase lead condition of the first range channel K2 relative to the second range channel K3 propagates through the shift register 1150 to provide the Doppler direction flag at the terminal 1148. If the phase in the second range channel K3 is the same as or leads the phase of the signal in the range channel K2, the shift register 1150 is reset to a default target recede condition, indicating that the target is receding or moving away.

The signal conditioner circuit 1110 includes portions responsive to the first and second range channels K2 and K3 of the front-end circuit 710 to provide a D.C. voltage having a magnitude proportional to the range of the target. This voltage appears at the output of the 100 ms 5th order integrator 1152. The voltage varies from 0–5 volts for a range of 1000 feet, and the variation of the voltage is linear between these values. The phase-shifted square waves at the outputs of the squaring amplifiers 1140 are applied to an exclusive OR gate within the 180° range detector 1144. When the two gate inputs are in phase, the output is zero volts. When they are 180° out of phase, the output is 5 volts. For phase shifts between 0° and 180°, the duration of the positive output pulse from the exclusive OR gate is proportional to the phase difference. Such output pulses are filtered by the 100 ms 5th order integrator 1152 to integrate the pulses, leaving only a D.C. average voltage level. This voltage is applied to a sample and hold amplifier 1164 which provides the output range signal at a terminal 1166.

The signal conditioner circuit 1110 includes a portion thereof for generating an interference flag at an output terminal 1168 signifying that a foreign radar transmitter frequency is being received by the system at the same time as the authentic target echo. Detection of this condition depends on the fact that interfering signals that appears in one of the range channels K2 and K3 or the Doppler channel K1 will cause a large amplitude unbalance between any two channels. To detect this condition, the signals within the first and second range channels K2 and K3 are applied to 30 db De-emphasis amplifiers 1170. The signals therefrom are passed through squaring amplifier 1172 and are then subjected to D.C. level conversion by 50 μs monostable oscillators 1174 and low pass filtering by 100 ms 2nd order integrators 1176. The voltages at the outputs of the integrators 1176 are compared with a D.C. level from the 100 ms 2nd order integrator 1128 in the Doppler channel K1. There is a separate window comparator 1178 for each range channel K2 and K3. The outputs of the window comparators 1178 trigger a logical "OR" switch 1180 if they are greater or less than the Doppler channel amplitude by 50 milli-volts. This can only occur if one of the range channels K2 and K3 or the Doppler channel K1 is receiving a foreign interfering transmission.

The signal conditioner circuit 1110 includes circuitry for providing a voltage indicating the speed of the vehicle. A signal taken from a tachometer or opto-electronic device is applied via a squaring amplifier 1182 before being converted into a precision 1.2 ms pulse train by a 1.2 ms monostable oscillator 1184, and then integrated into a D.C. voltage by a 200 ms 2nd order integrator 1186. The voltage at the output of integrator 1186, which varies from 0–5 volts, with 5 volts representing 100 mph, is then applied to a terminal 1188.

The various signals produced by the signal conditioner circuit 1110 may be applied to a data processor for appropriate utilization. The data processor may use information on target range, closing rate, direction, and vehicle speed to provide warnings, and where desired, to accomplish various safety functions. For example, a hazard evaluation algorithm can be executed using such information in conjunction with a hazard level chosen for a particular driver, to provide a warning when danger of a collision is present. Such information can also be used to accomplish emergency measures such as by applying the brakes of the vehicle or inflating an air bag.

As noted in connection with FIG. 6, the receiving intervals R1, R2 and DC within the receive frame 612 as provided by the receiver portion of the front-end circuit 710 are confined to the second, fifth and the seventh windows 614. This frees the remaining windows which include the first, the third, the fourth, the sixth, the eighth and the ninth windows, for other functions. For example, the vehicle radar system may be used in conjunction with a subsystem which utilizes wayside transponders. The available windows within the receive frame 612 allow for the transmission, receipt and other processing of signals in addition to the primary function of transmitting the radar signal at three different frequencies and segregation of the received signals into the Doppler channel K1 and the range channels K2 and K3 for determination of range and closing rate. A wayside transponder system is but one example, and still other arrangements can be incorporated which utilize the available windows.

Wayside Transponder

Figure 12:
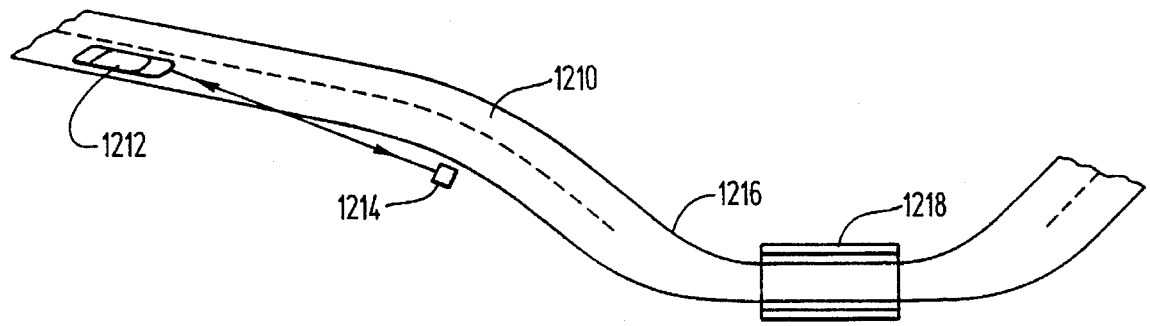
FIG. 12 is a plan view of a portion of a roadway illustration the manner in which a vehicle equipped with a radar system communicates with a wayside transponder in systems according to the invention.

FIGS. 12–18 provide examples of wayside transponder systems which use one of the available windows 614 for communications between the vehicular radar system and a wayside transponder. FIG. 12 shows a portion of a roadway 1210 along which a vehicle 1212 equipped with a radar system of the type previously described is travelling. The wayside transponder system includes a plurality of wayside transponders located at particular locations so as to provide to a vehicle information pertaining to such locations. In FIG. 12, a wayside transponder 1214 is located at the side of the roadway 1210.

As the vehicle 1212 approaches the transponder 1214, communications preferably take place between the two. As described hereafter, an interrogation message is transmitted by the radar system of the vehicle 1212 to the transponder 1214 once per second. The transponder 1214 responds by transmitting a message to the vehicle 1212 one frame later (18 microseconds). The message transmitted by the transponder 1214 may provide the vehicle with various types of information such as vehicle location, speed and availability of services along the roadway 1210 in the vicinity of the transponder 1214. The transponder 1214 may also be used to provide the vehicle 1212 with information which warns of potential hazards. For example, the transponder 1214 may warn the vehicle 1212 of an upcoming curve 1216 and a narrow one-lane bridge 1218 in the roadway 1210.

Figure 13:
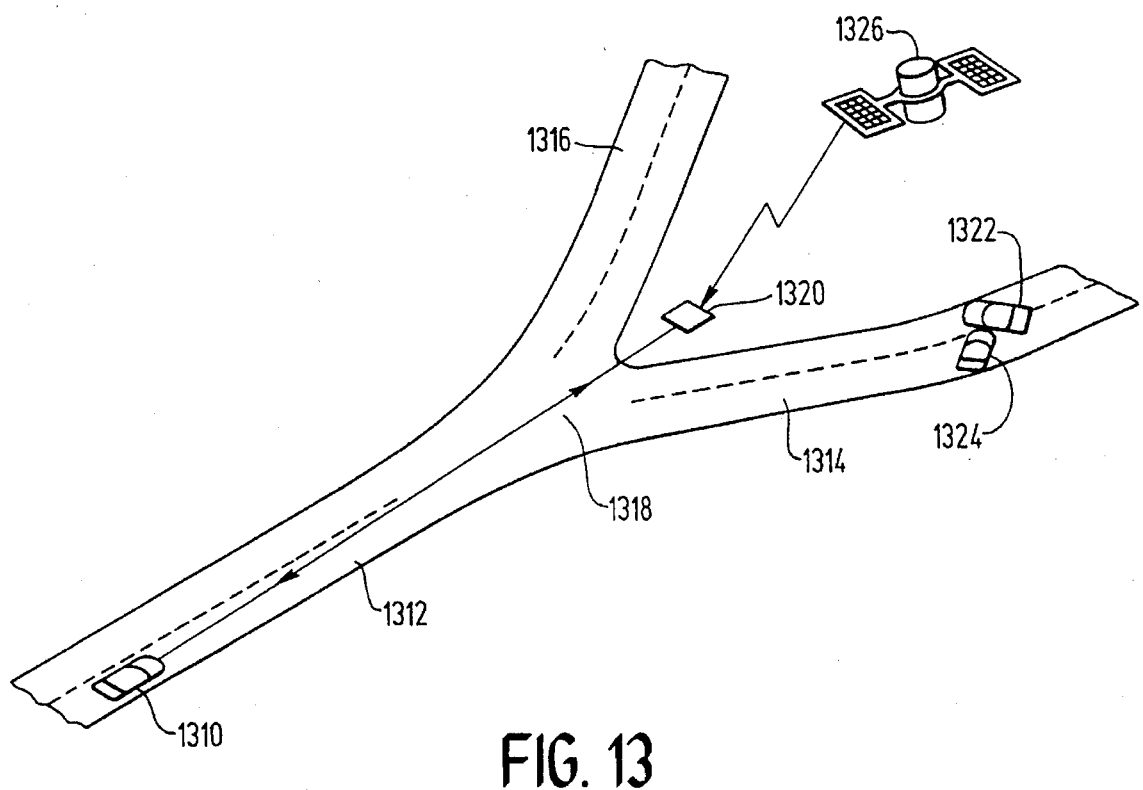
FIG. 13 is a plan view of a portion of roadway illustrating the manner in which a wayside transponder can be used to warn a vehicle of hazards and suggest alternative routes in systems according to the invention.

FIG. 13 provides a further example of the manner in which wayside transponders can be used to communicate useful information to a vehicle. In the example of FIG. 13, a vehicle 1310 is travelling along a roadway 1312 which divides into two different roadways 1314 and 1316 at an intersection 1318. A wayside transponder 1320 is located at the intersection 1318.

As the vehicle 1310 approaches the intersection 1318, communications occur between the vehicle 1310 and the wayside transponder 1320. Again, such communications take the form of an interrogating message transmitted by the vehicle 1310 to the wayside transponder 1320, and a responding message transmitted by the wayside transponder 1320 back to the vehicle 1310. In this instance, the message transmitted by the wayside transponder 1320 to the vehicle 1310 warns the vehicle 1310 of an accident involving vehicles 1322 and 1324 on the roadway 1314. The message may include information suggesting that the vehicle 1310 take an alternate route over the roadway 1316 to avoid the accident.

In systems according to the invention, the information communicated by a wayside transponder to a vehicle in response to interrogation of the transponder can be a fixed message which is changed only infrequently. The message can also be comprised of fixed portions and frequently updated portions. The updated portions can be provided by various communications means such as by way of a radio telemetry data link from a communication satellite. In the example of FIG. 13, such a communication satellite 1326 is shown. Updated information periodically provided to the satellite 1326 may be communicated to a plurality of different wayside transponders such as the transponder 1320 to update part or all of the message transmitted by the transponder 1320 to the vehicle 1310.

Figure 14:
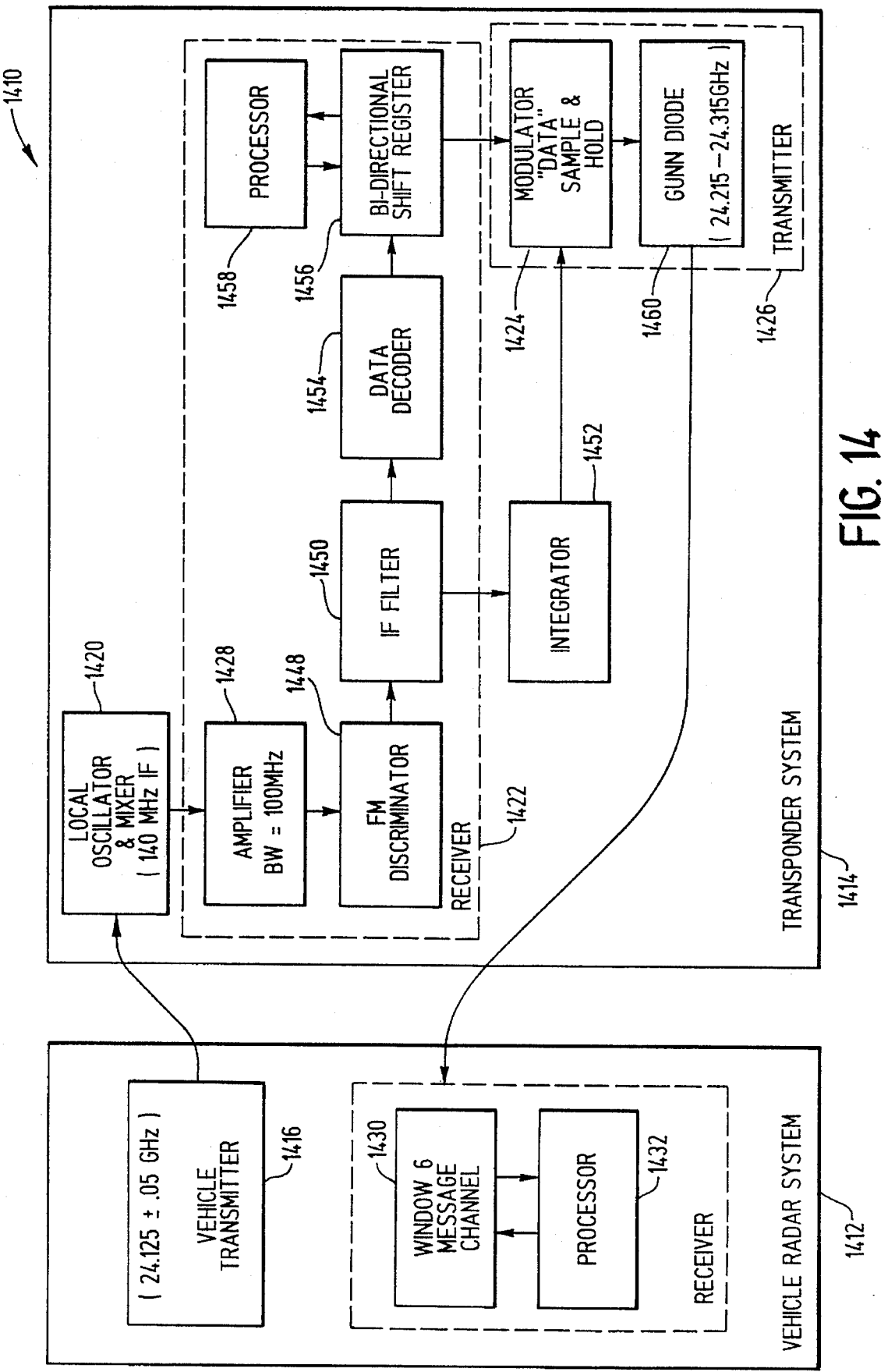
FIG. 14 is a block diagram of portions of the vehicle borne radar system and a wayside transponder illustrating the manner in which communications take place therebetween.
Figure 17:
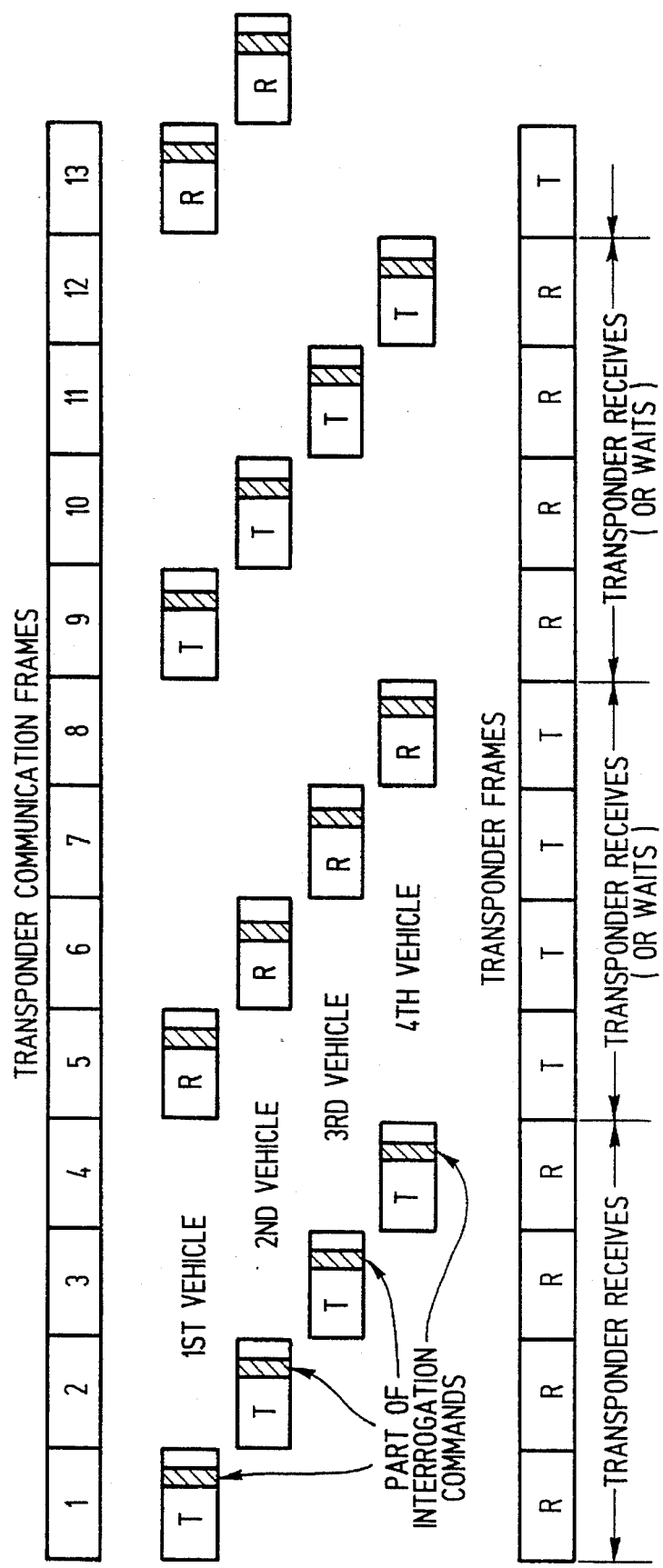
FIG. 17 is a diagrammatic representation of the manner in which a wayside transponder may communicate with multiple vehicles in time-multiplexed fashion.

FIG. 14 comprises an example of a vehicular radar wayside transponder system 1410 in accordance with the invention. The system 1410 includes a vehicle radar system 1412 which may be of the type previously described in connection with FIGS. 7 and 11. The system 1410 also includes a wayside transponder 1414. It will be understood that the system 1410 may include numerous other vehicles equipped with vehicle radar systems as well as numerous wayside transponders. However, for ease of description, the system 1410 is described in the context of the single vehicle radar system 1412 and the wayside transponder 1414.

The vehicle radar system 1412 includes a vehicle transmitter 1416 and a receiver 1418. As the vehicle bearing the radar system 1412 approaches the wayside transponder 1414, the vehicular transmitter 1416 transmits an interrogation message to the transponder 1414. The transmitted interrogation message is received by the transponder and coupled to a local oscillator and mixer 1420 in which the transmitted radar signal is heterodyned with the output of the local oscillator to produce a modulated intermediate frequency (IF) signal of 140 MHz. The IF signal is passed to a receiver 1422 within the transponder 1414. As described hereafter, the receiver 1422 processes the radar signal received from the vehicular transmitter 1416, then sends a message using a transponder transmitter 1426. The transponder transmitter 1426 transmits a radar signal which is 140 MHz above vehicular transmitter 1416. The transmission from the transponder 1414 contains a message which is then received by the receiver 1418 within the vehicle radar system 1412.

As previously described in connection with FIG. 6, 7 and 11, multi-frequency radar transmission and reception can be confined to selected time interval windows 614 of the transmit and receive frame 610 and 612, so that other time interval windows can be used for other activities and subsystems, such as the vehicular radar wayside transponder system 1410. In the present example, the sixth window 614 is used to provide communications between the vehicle radar system 1412 and the transponder 1414. In this way, the transponder system 1410 does not interfere with normal transmission and reception of the vehicle radar system 1412. Other available windows 614 may concurrently be used for other functions or by other subsystems.

In the vehicular wayside transponder system 1410 of FIG. 14, the vehicular transmitter 1416 may transmit its interrogation message several times at a rate of once per second. The interrogation message may be continuously processed or is only processed by the transponder 1414 upon recognition of a predefined preamble that indicates a vehicle is interrogating the transponder. The transponder 1414 responds to the interrogation message by processing the message, as hereafter described, and sending a responding message through the transponder transmitter 1426. The responding message is received within the receiver 1418 of the vehicle radar system 1412 where it is routed to a window 6 message channel 1430 during the sixth window. A processor 1432 responds to the message received within the channel 1430 to process the message accordingly.

FIGS. 15A–15D illustrate waveforms useful in explaining the operation of the vehicular wayside transponder system 1410. FIG. 15A illustrates a succession of five different frames of the vehicle radar system 1412. The frames illustrated in FIG. 6 represent a transmit frame 61 0, a corresponding receive frame 612, and three frames preceding the receive frame 612. As previously described in connection with FIG. 6, the normal radar transmission of the radar system shown and described in connection with FIGS. 7 and 11 comprises transmission of the radar signal at a first frequency within the first frequency interval 616, and at a second frequency within the second frequency interval 618, and then at a third frequency within a third frequency interval 620. The transmit frame 610 preferably includes nine time interval windows 614. The first three windows occur within the frequency interval 616. The second three windows occur within the second frequency interval 618. The last three of the nine windows occur within the third frequency interval 620. Transmission of the radar signals by a vehicular radar system 1412 at the three different frequencies is accomplished by frequency shift keying, as described in connection with FIG. 7.

The receive frame 612 which is shown in FIG. 6 corresponds to the transmit frame 610 and also preferably includes nine different time interval windows 614. The first transmitted frequency is detected by the vehicular radar system 1412 within the first range channel K2 during a receive interval R1 which occurs within the second window. The second frequency is detected within the second range channel K3 during a second receive interval R2 which occurs within the fifth time interval. The third frequency is detected within the Doppler channel K1 at a third receive interval DC occurring within the seventh time interval window. As previously noted, the vehicle radar system 1412 and the transponder 1414 communicate during the sixth time interval window.

Once the transponder 1414 receives a frame containing an interrogation message, the transponder 1414 uses the next frame to transmit a response message from the transponder 1414 to the vehicle radar system 1412. The transponder 1414 accomplishes this by waiting 16 µs from the end of the window containing the interrogation message. The waveform of FIG. 15B comprises a pulse 1444 which coincides with the sixth window of the frame 1434. The vehicle radar system 1412 transmits the interrogation messages to the transponder 1414 during the pulse 1444.

FIG. 15C shows the five different frames 1434, 1436, 1438, 1440 and 1442 shown in FIG. 15A. FIG. 15C relates to the transponder 1414 which transmits its reply messages to the vehicle radar system 1412 16 µs after receipt of the end of the 2 µs window used to transmit the interrogation message. Such transmission may be received by the vehicle radar system 1 412 during the occurrence of pulses 1446 which are shown in FIG. 15D. The pulses 1446 coincide with the sixth window of the frame 1440.

Transmissions by either the vehicle radar system 1412 or the transponder 1414 during a 2 µs interval which defines the sixth window of a frame are further divided into a number of bits (preferably 32), forming a word 1610 as shown in FIG. 16. The multi-bit word 1610 preferably includes a start bit 1612 at the beginning thereof, preferably followed by a number of preamble bits 1610 (preferably 6). A number of bits of binary data 1616 (preferably 24) follow the preamble 1614. A stop bit 1618 at the end of the word 1610 preferably follows the bits of binary data. The value of each binary bit is represented by the frequency transmitted by the vehicle radar system 1412. In one embodiment of the present invention, the message bits may be used to encode a number of messages equal to 2 raised to a power equal to the number of bits in the message. For example, if there are 24 bits in the message, then $2^{24}$ different messages can be communicated within one window of one frame.

As described in connection with FIG. 7, the three different frequencies illustrated in FIG. 6 are transmitted during each transmit frame 610 using frequency shift keying. During the sixth window, the transmission frequency is selectively shifted between two frequencies, one frequency to denote a "one" and another frequency to denote a "zero" for each bit of the 32 bit word 1610. In one embodiment, the transmission frequency is shifted down from the window 6 center frequency (e.g. 24.125 GHz in the example shown in FIG. 6) by 250 KHz to represent a "one" and by 125 KHz to represent a "zero". Therefore, in the example of FIG. 6, the "one" frequency is 24.124750 GHz and the "zero" frequency is 24.124875 GHz. After the vehicle radar system 1412 transmits the 32 bit word 1610 shown in FIG. 16, the vehicle radar system 1412 waits for a response from the transponder 1414 by turning on the window 6 message channel 1430 during window 6 of the next frame.

The 32 bit word 1610 transmitted by the vehicular transmitter 1416 is heterodyned with the output of the local oscillator 1420 within the transponder 1414 to produce the modulated IF frequency having a carrier frequency of 140 MHz. The IF signal is coupled to the amplifier 1428. From the amplifier 1428, the 2 μs wide sample of the modulated IF frequency is provided to an FM discriminator 1448 which converts the modulated IF signal into voltage amplitude samples. When the IF is at a higher frequency, representing a "one", the output of the discriminator 1448 has a higher voltage amplitude. Conversely, when the IF is at a lower of the two frequencies, denoting a "zero", the output of the discriminator 1448 has a lower amplitude. The output of the FM discriminator 1448 is filtered by an IF filter 1450 to remove any remaining IF content. The D.C. component is coupled to a data decoder 1454. The data decoder synchronizes the data and generates digital logic levels which can be coupled to a shift register 1456. The digital logic levels represent serial data which comprises the interrogation request in the form of the 32 bit word 1610 shown in FIG. 16.

The output from the IF filter 1450 is also coupled to an integrator 1452 which averages the D.C. amplitude. The output of the integrator 1452 is coupled to a modulator 1424. In the preferred embodiment of the present invention, the sample and hold circuit is digital, and includes a shift register which receives a digital word that represents the value of the D.C. amplitude. The output of the sample and hold circuit within the modulator 1424 is used to adjust the carrier frequency output by a Gunn diode 1460 which is modulated by data received from the shift register 1456.

In the preferred embodiment, the amplitude of the signal coupled to the modulator is sampled by the sample and hold circuit at the end of the sixth window. The sample enters a sample and hold shift register and is clocked at a rate of 2 μs. After 16 μs, the sample is output by the sample and hold shift register. Thus, up to 8 different D.C. amplitude values may be stored in the sample and hold shift register at any one time, with each D.C. amplitude value being properly synchronized to the transmission by the transponder 1414 of a response to the associated interrogation, such that the output frequency of the transponder 1414 is equal to the frequency of the vehicle transmitter 1416, plus 140 MHz IF frequency offset, which transmitted the associated interrogation. The data which modulates the output frequency transmitted by the transponder 1414 is supplied by a processor 1458 through the shift register 1456 in response to the received interrogation.

The serial data at the output of the integrator 1452 is decoded by a data decoder 1454 in the form of a synchronous clock, before being advanced through the shift register 1456. Shifting the data through the shift register 1456 enables the data to be read by the processor 1458. The processor 1458 detects the start bit 1612 and the 6 bits of the preamble 1614 of the 32 bit word 1610, and uses the 6 preamble bits for synchronization of the data decoder 1454 and the shift register 1456. In subsequent frames, the precise 2 μs width of the data transmitted during window 6, as represented by the pulses 1444 in FIG. 15B, is used to augment the frequency and phase synchronization of the decoder clock.

The D.C. component sampled by the sample and hold circuit within the modulator 1424 is provided to a conventional Gunn diode 1460. The D.C. output from the sample and hold circuit is applied to modify the varactor voltage of the Gunn diode 1460. Modification of the varactor voltage of the Gunn diode 1460 is necessary because the center frequency of the Gunn diode within the transmitters of the radar systems in different vehicles are slightly different, due to manufacturing tolerances and environmental factors. The Gunn diode 1460 of the transponder transmitter 1426 must be tuned to the same exact frequency as that of the interrogating radar system plus the IF frequency offset of 140MHz.

Following synchronization, the transponder 1414 transmits a reply message to the vehicle radar system 1412 during a frame that follows immediately after the frame comprising the interrogation message. Transmission by the transponder transmitter 1426 is accomplished in the same manner as the transmission of interrogation messages by the vehicle radar system 1412. The message is transmitted by frequency shift key modulation at 140 MHz above the frequency received by the transponder during the window 6 period of the receive frame 610 minus 125 KHz or 250 KHz depending upon whether a "one" or a "zero" is being transmitted. The transponder transmitter 1426 can assume a form similar to that of the vehicular transmitter 1416, with the circuits of FIGS. 7 and 11 providing one detailed example. The additional 140 MHz that is added to the transponder output allows the signal that is received by the vehicle receiver 1412 to use the output of the transmitter oscillator as a local oscillator to heterodyne the received signal down to a 140 MHz IF carrier frequency.

As previously noted, transmissions by the vehicular transmitter 1416 and receptions of those transmissions by the receiver 1422 of the transponder 1414 take place during the frames spaced at least one second apart. Typically, the vehicular transmitter 1416 sends an interrogation message which is short enough to be contained within one of the 32 bit words 1610 shown in FIG. 16. Accordingly, such an interrogation message can be sent within a single frame. The responding message from the transponder 1414 may be capable of transmission within a single frame, or a plurality of frames, each spaced one second apart. Variable length messages are accommodated by a special end-of-message word which is transmitted last. Where the reply message sent to the vehicle radar system 1412 by the transponder 1414 is longer than window 6 of a single frame, the vehicle radar system 1412 receives the message chopped into 2 μs segments in window 6 of a series of frames. This is described hereafter in connection with FIG. 18. After reception and heterodyning, the 2 μs wide words are transferred to the window 6 message channel 1430 within the receiver 1418 of the vehicle radar system 1412. There, the data contained within the transmitted word is decoded into binary data. The binary data is examined by the processor 1432 to determine if it is addressed to the receiving vehicle. If it is, then the message is saved and displayed. The description thus far has dealt with a single vehicle in communication with a wayside transponder. It is possible, however, for a plurality of vehicles to communicate with a wayside transponder 1414. The fact that each vehicle transmits an interrogation only once every second, each such interrogation being part of an 18 μs frame, means that the chance that the two vehicles will be transmitting an interrogation frame at the same time is slight, even with a relatively large number of vehicles on the road. Furthermore, the frequency transmitted by each vehicle may be anywhere within the range 24.125+/−0 .05 GHz. Since the transmissions are only modulated by 125 KHz, there are a number of frequencies that could be used as carrier frequencies by any one vehicle. The response to each vehicle must be transmitted 16 μs after the stop bit of the message received at the frequency received plus the IF frequency offset of 140MHz. In one embodiment of the present invention, up to nine sample and hold circuits are present, each used in round robin fashion to sample the frequency of the last received interrogation. The processor 1458 ensures that the message that is sent to each vehicle begins transmitting 16 μs after the stop bit of the interrogation is received and is transmitted at the frequency at which it was received plus the IF frequency offset of 140MHz.

In the preferred embodiment of the present invention, vehicles transmit with approximately 1.9 W effective radiated power. Alternatively, other power levels may be used. In accordance with one embodiment of the present invention, this results in the transponder being able to receive a signal from a vehicle within a range of approximately 2000 ft. A vehicle traveling at 60 mph will traverse 2000 ft of roadway in approximately 20 seconds. Therefore, each vehicle will have an opportunity to interrogate the transponder at least 20 times before passing the transponder.

Figure 18:
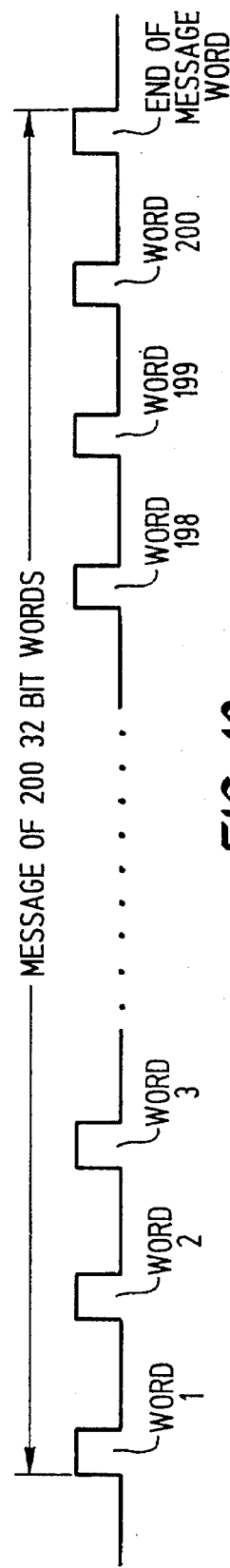
FIG. 18 is a diagrammatic representation of a multi-word message of the type which may be communicated from a wayside transponder and a vehicle.

As previously noted, a transponder can sometimes transmit its entire reply message to a vehicle within a single frame. However, the message within each frame is limited to a 32 bit word, and therefore the transponder may require a plurality of frames to transmit its complete message. Therefore, in an alternative embodiment, once a link between a transponder and a vehicular radar system is made, the rate at which frames which are transmitted may be greater than one per second. An example of a message which requires 200 of the 32 bit words 1610 of FIG. 16 is illustrated in FIG. 18. FIG. 18 illustrates the first 3 words comprising words 1, 2 and 3, and the last 3 words comprising words 198, 199 and 200. Following word 200, an end of message word is transmitted to indicate to the vehicle radar system that the message has ended. Each of the words shown in FIG. 18 is transmitted within the 2 μs long window 6 of a frame. The 24 bit data section of the transmitted word can contain upto $2^{24}$ or 16,777,216 different message combinations. In an alternative embodiment, each such message may be an address to a read-only-memory containing the message text.

As previously noted, a variety of different communications between a vehicle and a wayside transponder are possible. For example, the transponder can transmit the same pre-programmed warning message to each approaching vehicle from which it receives an interrogation. Such a message could be used to complement posted warning and speed limit signs. In a further example, the vehicle can be provided by the transponder with a pre-programmed message that the transponder transmits only when interrogated by a particular type of vehicle, such as trucks, campers, buses or vans. The pre-programmed message can contain frequently updated information of various kinds to enable the driver to identify the vehicles position to avoid traffic problems, to be alerted to roadside facilities, to be warned of road hazards, or to adapt to severe weather or other unusual driving conditions that may pertain to the particular type of vehicle. Personal messages are also possible upon identification of a particular vehicle by the transponder. As previously noted in connection with FIG. 13, updatable portions of a message can be loaded into the transponder by a radio telemetry data link, such as used by communications satellites, or by a telephone link.

In a still further example of possible communications between a vehicle and a wayside transponder, the vehicle can receive a time-delayed version of its own transmission at a relatively strong reception level compared to signals reflected from a target. This permits positive identification of range and closing rate in dangerous situations, such as in the case of steep hills with sharp turns. These parameters together with parameters such as the vehicle's ground speed allow the microprocessor of the vehicle radar system to execute a hazard algorithm and thereby determine that operating conditions are unsafe.

While a number of embodiments of the present invention have been described, it will be understood that various modifications may be made without departing from the spirit and scope of the invention. For example, the transceiver may transmit and receive RF or infrared radiation. Also, the RF transmit frequency may be a multiple frequency signal having a multitude of frequencies, each frequency being time division multiplexed with the others. Furthermore, the RF transmit frequency may be a continuous wave signal. Still further, the interrogation rate may be substantially greater, or less, than one per second. Additionally, the RF transmit signal may be a pseudo-pulse signal in which the Gunn diode 9 is not turned completely off, but rather alternates between two discrete power levels. Still further, a wide variety of mechanisms or methods can be used for warning the vehicle operator of the presence of an obstacle, such as bells, physical vibrations, visual indications placed on the dashboard or windshield, and/or use of a mirror incorporating a material (e.g., lead lanthanum zirconate titanate, or PLZT) which changes color (i.e., turns red) or otherwise changes optical properties when the cruise control system detects an obstacle in the path of the vehicle. Still further, the values disclosed above may be varied as desired, and are not limited to the particular values disclosed. Still further, the present invention may transmit a message through the radar system, but receive the response to the message through another receiver, such as commercial radio station transmission. For example, if a sufficient number of vehicles pass a particular radar transponder, a message may be transmitted to a commercial radio station which broadcasts the conditions on the roadway on which the transponder is located. Also, a digital signal processor may be used in place of analog circuitry.

Accordingly, it is to be understood that the invention is not to be limited by the specific illustrated embodiment, but only by the scope of. the appended claims,

We claim:

1. A radar system comprising the combination of:
   a. a vehicle borne radar system for transmitting radar signals and receiving the transmitted radar signals reflected back to the radar system by a target, during a first selected portion of each of a sucession of time interval frames; and
   b. a transponder for communicating with the vehicle borne radar system by transmitting signals to be received by the vehicle borne radar system during a second selected portion a time interval frame, the second portion of the time interval frame being different from the first selected portion within each of the succession of time interval frames.

2. The invention set forth in claim 1, wherein the vehicle borne radar system is operative to transmit communications to the transponder at a rate of one per second.

3. The invention set forth in claim 1, wherein each of the succession of time interval frames is divided into a like plurality of time interval windows, with selected ones of the windows comprising the first selected portion and a different selected one of the windows comprising the second selected portion.

4. The invention set forth in claim 3, wherein each of the succession of time interval frames is divided into nine time interval windows, with the second, fifth and seventh windows comprising the first selected portion and the sixth window comprising the second selected portion.

5. A radar system comprising the combination of:
   a) a vehicle borne radar system capable of transmitting radar signals during a selected time interval window within at least one of a succession of time interval frames and capable of receiving radar signals during the selected time interval window within the succession of time interval frames; and
   b) a wayside transponder for mounting in a fixed location along a roadway and capable of receiving radar signals from the vehicle borne radar system during the selected time interval window within a succession of time interval frames and capable of transmitting radar signals to the vehicle borne radar system during the selected time interval windows of the succession of time interval frames.

6. The invention set forth in claim 5, wherein each of the succession of time interval frames is comprised of a plurality of like time interval windows, one of which comprises the selected time interval window.

7. The invention set forth in claim 6, wherein the vehicle borne radar system is capable of transmitting radar signals towards a target and receiving the transmitted radar signals reflected back to the radar system by the target during at least one of the plurality of like time interval windows other than the one which comprises the selected time interval window.

8. The invention set forth in claim 5, wherein radar signals transmitted by the vehicle borne radar system during the selected time interval window within at least one of the succession of time interval frames comprise interrogation messages to the wayside transponder, and the radar signals received by the vehicle borne radar system during the selected time interval window within a next time interval frame which occurs after a time interval frame comprising an interrogation comprises messages provided by the wayside transponder in response to the interrogation messages from the vehicle borne radar system.

9. The invention set forth in claim 8, wherein the messages provided by the wayside transponder are fixed messages pre-programmed into the wayside transponder.

10. The invention set forth in claim 8, wherein the messages provided by the wayside transponder include at least a portion thereof which is periodically updated by signals from a radio telemetry data link.

11. A radar system comprising the combination of:
    a) a vehicle borne radar system having a transmitter capable of transmitting communications signals during a first assigned one of a plurality of windows within each of a plurality of time interval frames to a transponder, and for transmitting radar signals during a second assigned one of the plurality of windows including a receiver for receiving radar signals during the second assigned one of the plurality of windows with each of the plurality of time interval frames and for receiving communications signals during the first assigned one of the plurality of windows within each of the plurality of time interval frames;
    b) a transponder including:
       I) a transmitter for transmitting radar signals to the vehicle borne radar system during the first assigned one of the plurality of windows within each of the plurality of time interval frames; and
       ii) a receiver for receiving and processing radar signals transmitted by the vehicle borne radar system.

12. The invention set forth in claim 11, wherein the transponder includes a local oscillator having an output coupled to the gate and also coupled to be heterodyned by radar signals received from the vehicle borne radar system, and the receiver includes an amplifier coupled to an output of the gate and having an output, an FM discriminator coupled to the output of the amplifier and having an output, an intermediate frequency filter coupled to the output of the FM discriminator and having an output, and an integrator coupled to the output of the IF filter and having an output providing serial data from the radar signals received from the vehicle borne radar system.

13. The invention set forth in claim 12, wherein the receiver further includes a shift register having an input and an output, a data decoder coupled between the output of the integrator and the input of the data decoder, and a processor coupled to the output of the shift register.

14. The invention set forth in claim 13 wherein the transponder includes a transmitter for transmitting radar signals to the vehicle borne radar system, the transmitter including a transmission control diode coupled to the integrator, the integrator providing the D.C. component of signals provided thereto by the IF filter to tune the center frequency of the diode.

\* \* \* \* \*